United States Patent
Kawahara et al.

(10) Patent No.: US 6,667,285 B1
(45) Date of Patent: Dec. 23, 2003

(54) LUBRICATING OIL FOR REFRIGERATOR, HYDRAULIC FLUID COMPOSITION FOR REFRIGERATOR AND METHOD FOR LUBRICATING OF REFRIGERATOR

(75) Inventors: Yasuyuki Kawahara, Uji (JP); Kouji Takahashi, Kyoto (JP); Hirotaka Tomizawa, Tokorozawa (JP)

(73) Assignee: New Japan Chemical Co., Ltd., Kyoto (JP)

( * ) Notice: Subject to any disclaimer, the term of this patent is extended or adjusted under 35 U.S.C. 154(b) by 0 days.

(21) Appl. No.: 09/959,825

(22) PCT Filed: May 10, 2000

(86) PCT No.: PCT/JP00/02971

§ 371 (c)(1),
(2), (4) Date: Nov. 8, 2001

(87) PCT Pub. No.: WO00/68345

PCT Pub. Date: Nov. 16, 2000

(30) Foreign Application Priority Data

May 10, 1999 (JP) .......................... 11-128689

(51) Int. Cl.$^7$ .......................... C10M 105/38; C09K 5/24
(52) U.S. Cl. .......................... 508/485; 252/68
(58) Field of Search .......................... 508/485; 252/68

(56) References Cited

U.S. PATENT DOCUMENTS

| | | | | |
|---|---|---|---|---|
| 4,172,176 A | * | 10/1979 | Tanaka et al. | 428/694 BP |
| 4,978,468 A | * | 12/1990 | Yoshimura et al. | 252/79 |
| 5,391,313 A | * | 2/1995 | Antika et al. | 252/68 |
| 5,997,760 A | * | 12/1999 | Schlosberg et al. | 252/68 |
| 6,228,820 B1 | * | 5/2001 | Sakai et al. | 508/485 |
| 6,374,629 B1 | * | 4/2002 | Oberle et al. | 62/473 |

FOREIGN PATENT DOCUMENTS

| | | | |
|---|---|---|---|
| CA | 1101881 | * | 5/1981 |
| EP | 678363 | * | 2/1995 |
| EP | 0 900 863 | * | 8/1998 |
| JP | 7-247492 | | 9/1995 |

* cited by examiner

Primary Examiner—Jacqueline V. Howard
(74) Attorney, Agent, or Firm—Armstrong, Kratz, Quintos, Hanson & Brooks, LLP

(57) ABSTRACT

The invention provides a lubricating oil for refrigerators, comprising (a) at least one ester represented by the formula (1)

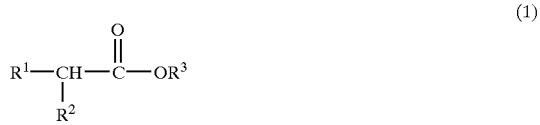

wherein $R^1$ is $C_1$ to $C_{18}$ straight-chain alkyl or $C_3$ to $C_{18}$ branched-chain alkyl; $R^2$ is H, $C_1$ to $C_{18}$ straight-chain alkyl or $C_3$ to $C_{18}$ branched-chain alkyl; with the proviso that the total number of carbons contained in the alkyls represented by $R^1$ and $R^2$ is 2 to 18 and that when $R^2$ is H, $R^1$ is branched-chain alkyl; and $R^3$ is $C_1$ to $C_{20}$ straight-chain alkyl, $C_3$ to $C_{20}$ branched-chain alkyl or $C_3$ to $C_{10}$ cycloalkyl, optionally in combination with (b) at least one member selected from the group consisting of fatty acid polyol esters, phthalic acid esters, alicyclic dicarboxylic acid esters, polyvinyl ethers, hydrocarbon oils and polyalkylene glycols; as well as a method for lubricating a refrigerator using such a lubricating oil, and a working fluid composition for refrigerators comprising (I) component (a) or components (a) and (b) and (II) a refrigerant.

18 Claims, 1 Drawing Sheet

LUBRICATING OIL FOR REFRIGERATOR, HYDRAULIC FLUID COMPOSITION FOR REFRIGERATOR AND METHOD FOR LUBRICATING OF REFRIGERATOR

This application is a 371 of PCT/JP00/02971 filed May 10, 2000.

TECHNICAL FIELD

The present invention relates to a lubricating oil for compressors such as those of automotive air conditioners, refrigerators, room air conditioners, and large-scale refrigerators for industrial use, and is intended to provide a low-viscosity lubricating oil for refrigerators comprising a branched-chain carboxylic acid monoalkyl ester with outstanding hydrolytic stability.

BACKGROUND ART

Unlike the properties required of ordinary lubricating oils such as engine oils, transmission oils, hydraulic oils and turbine oils, considerably different performance is required of oils used in the compressors of refrigerators because of the use of refrigerants in refrigerators. Particularly, in cases where esters are used as the lubricating oil for refrigerators, the requisite properties include lubricity as well as miscibility with refrigerants, electrical insulating property and a high level of hydrolytic stability.

Conventionally used refrigerants for refrigerators are fluorocarbons, such as those containing one or more chlorine atoms within the molecule, such as CFC-11 (trichloromonofluoromethane), CFC-12 (dichlorodifluoromethane) and HCFC-22 (monochlorodifluoromethane). However, it has become increasingly evident that such volatile substances are destroying the ozone layer and are a source of global warming, leading to various adverse effects on humans and the earth's environment, so that the manufacture of CFC's is now prohibited, and there is an international commitment to step-wise reduction in HCFC level. Natural refrigerants such as hydrocarbons, carbon dioxide and ammonia, and replacement fluorocarbons such as HFC-134a, are increasingly being used instead as chorine-free refrigerants that will avoid destroying the ozone layer.

Because of good miscibility that conventional chlorofluorocarbons have with lubricating oils based on mineral oils, such mineral oil lubricating oils were used as lubricating oils for refrigerators. Lubricating oils for refrigerators circulate in the refrigerator system along with refrigerant discharged from the compressor, and then the good miscibility between chlorofluorocarbons and mineral oil-based lubricating oils prevented the refrigerant and lubricating oil from separating.

However, replacement fluorocarbons (hydrofluorocarbons) such as HFC-134a have much higher molecular polarity than chlorofluorocarbons, they have poor miscibility with mineral oil-based lubricating oils. Poor miscibility between refrigerants and lubricating oils can result in the separation of the refrigerant and lubricating oil during operation, leading to seizure as a result of insufficiently lubricated compressors.

This has led to the use of polyglycols (polyalkylene glycols, polyethers) or esters, which have good miscibility, as lubricating oils to be used with replacement fluorocarbons. However, the electrical insulating property of polyglycols is a problem, and although they can be used in automotive air conditioners, they are unsuitable for use in hermetic refrigerator compressors.

Because esters have good electrical insulating properties, they can be used in various applications. Particularly, esters of neopentyl polyol and monovalent carboxylic acids (polyol esters) are actually being used.

However, among the polyol esters, esters of straight-chain carboxylic acids have poor hydrolytic stability and are decomposed through hydrolysis, and therefore polyol esters of mixtures of branched and straight-chain carboxylic acids, or polyol esters of branched-chain carboxylic acids are being used. Even so, the hydrolytic stability thereof is still poor, requiring complicated operations, such as the need to monitor air and moisture during assembly and maintenance or repair of refrigerators. Thus, there is a need to develop esters with better hydrolytic stability. There is a particular need to develop esters having better electric insulating properties and miscibility with refrigerants, and better hydrolytic stability.

On the other hand, aliphatic carboxylic acid monoesters such as coconut oil methyl ester, 2-ethylhexyl laurate, 2-ethylhexyl palmitate and isobutyl stearate have conventionally been used as base oils in metal processing oils and the like. However, such aliphatic straight-chain carboxylic acid monoesters suffer from poor hydrolytic stability, and have poor miscibility with replacement fluorocarbons, making them unusable as lubricating oils for refrigerators.

Furthermore, in light of the recent problem of global warming, there has been development of high-efficiency equipment for the purposes of energy conservation in various types of refrigerators in order to reduce carbon dioxide emission, which is a major cause of warming. To minimize energy loss in such equipment, there have been improvements in the materials for the parts that are used, and it has become essential to lower the viscosity of lubricating oils to reduce friction loss during operation. Examples of such low-viscosity oils include those with a kinematic viscosity (at 40° C.) of 32 mm$^2$/s (VG32), 15 mm$^2$/s (VG15), 10 mm$^2$/s (VG10), and some with even lower viscosity properties. There is thus increasing demand for esters with lower viscosity and better hydrolytic stability.

DISCLOSURE OF THE INVENTION

In view of the foregoing, an object of the present invention is to provide a lubricating oil for refrigerators that overcomes such drawbacks. A particular object of the present invention is to provide a low-viscosity lubricating oil for refrigerators with better hydrolytic stability.

As a result of extensive research to achieve the aforementioned object, the present inventors has found that certain aliphatic branched-chain carboxylic acid monoalkyl esters, prepared by the esterification of a specific aliphatic saturated branched-chain carboxylic acid and a specific monohydric alcohol, are excellent in hydrolytic stability, electrical insulating properties and miscibility with refrigerants, and also reduce the viscosity of lubricating oils for refrigerators, and these findings have led to the completion of the present invention.

Thus, the lubricating oil for refrigerators according to the present invention comprises at least one aliphatic saturated branched-chain carboxylic acid monoalkyl ester represented by the formula (1)

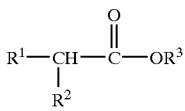

(1)

wherein $R^1$ is $C_1$–$C_{18}$ straight-chain alkyl or $C_3$–$C_{18}$ branched-chain alkyl; $R^2$ is hydrogen, $C_1$–$C_{18}$ straight-chain alkyl or $C_3$–$C_{18}$ branched-chain alkyl; with the proviso that the total number of carbon atoms contained in the alkyls represented by $R^1$ and $R^2$ is 2 to 18 and that when $R^2$ is hydrogen, $R^1$ is a branched-chain alkyl; and $R^3$ is $C_1$–$C_{20}$ straight-chain alkyl, $C_3$–$C_{20}$ branched-chain alkyl or $C_3$–$C_{10}$ cycloalkyl.

It has also been found that (I) at least one aliphatic saturated branched-chain carboxylic monoalkyl ester represented by the aforementioned formula (1) achieve(s) excellent advantages when used in combination with (II) a conventional lubricating oil for refrigerators, such as a fatty acid polyol ester, a phthalic acid ester, an alicyclic dicarboxylic acid ester, a polyvinyl ether, a hydrocarbon oil, a polyalkylene glycol or the like. For example, better hydrolytic stability is achieved in lubricating oils based on both components (I) and (II), and the reduction in the viscosity is achieved in lubricating oils based on components (I) and (II).

Thus, the present invention also provides a lubricating oil for refrigerators, characterized in that it comprises a mixture of
  a) at least one aliphatic saturated branched-chain carboxylic acid monoalkyl ester represented by the formula (1) and
  b) at least one member selected from the group consisting of
    i) fatty acid polyol esters,
    ii) phthalic acid esters,
    iii) alicyclic dicarboxylic acid esters,
    iv) polyvinyl ethers,
    v) hydrocarbon oils, and
    vi) polyalkylene glycols,
wherein the weight ratio of component a):component b) is 0.5:99.5 to 99.5:0.5.

It has also been found that the lubricating oil for refrigerators of the present invention, particularly its component, namely at least one aliphatic saturated branched-chain carboxylic acid monoalkyl ester represented by the aforementioned formula (1), has good miscibility with refrigerants, particularly hydrofluorocarbon refrigerants, and that a mixture of at least one such ester and a refrigerant, particularly a hydrofluorocarbon refrigerant, acts as a working fluid for refrigerators.

Accordingly, the present invention also provides a working fluid composition for refrigerators, comprising (I) at least one aliphatic saturated branched-chain carboxylic acid monoalkyl ester represented by the formula (1) of the present invention and (II) a refrigerant (particularly at least one hydrofluorocarbon refrigerant).

Additionally, the present invention provides a working fluid composition for refrigerators, comprising
  (I) a) at least one aliphatic saturated branched-chain carboxylic acid monoalkyl ester represented by the above formula (1), and
    b) at least one member selected from the group consisting of i) fatty acid polyol esters, ii) phthalic acid esters, iii) alicyclic dicarboxylic acid esters, iv) polyvinyl ethers, v) hydrocarbon oils and vi) polyalkylene glycols, and
  (II) a refrigerant (particularly, at least one hydrofluorocarbon refrigerant).

Furthermore, the present invention provides a method for lubricating a refrigerator, particularly a method for lubricating refrigerators using at least one hydrofluorocarbon refrigerant, characterized by the use of the aforementioned lubricating oil for refrigerators.

Furthermore, the present invention provides use of an aliphatic saturated branched-chain carboxylic acid monoalkyl ester represented by the formula (1) as a lubricating oil for refrigerators, particularly as a luburicating oil for refrigerators using a refrigerant (particularly at least one hydrofluorocarbon refrigerant).

Similarly, the present invention provides use of a mixture of
  a) at least one aliphatic saturated branched-chain carboxylic acid monoalkyl ester represented by the formula (1) and
  b) at least one member selected from the group consisting of i) fatty acid polyol esters, ii) phthalic acid esters, iii) alicyclic dicarboxylic acid esters, iv) polyvinyl ethers, v) hydrocarbon oils and vi) polyalkylene glycols,
as a lubricating oil for refrigerators, particularly as a lubricating oil for refrigerators using a refrigerant (particularly at least one hydrofluorocarbon refrigerant).

DETAILED DESCRIPTION OF THE INVENTION

Figure 1:
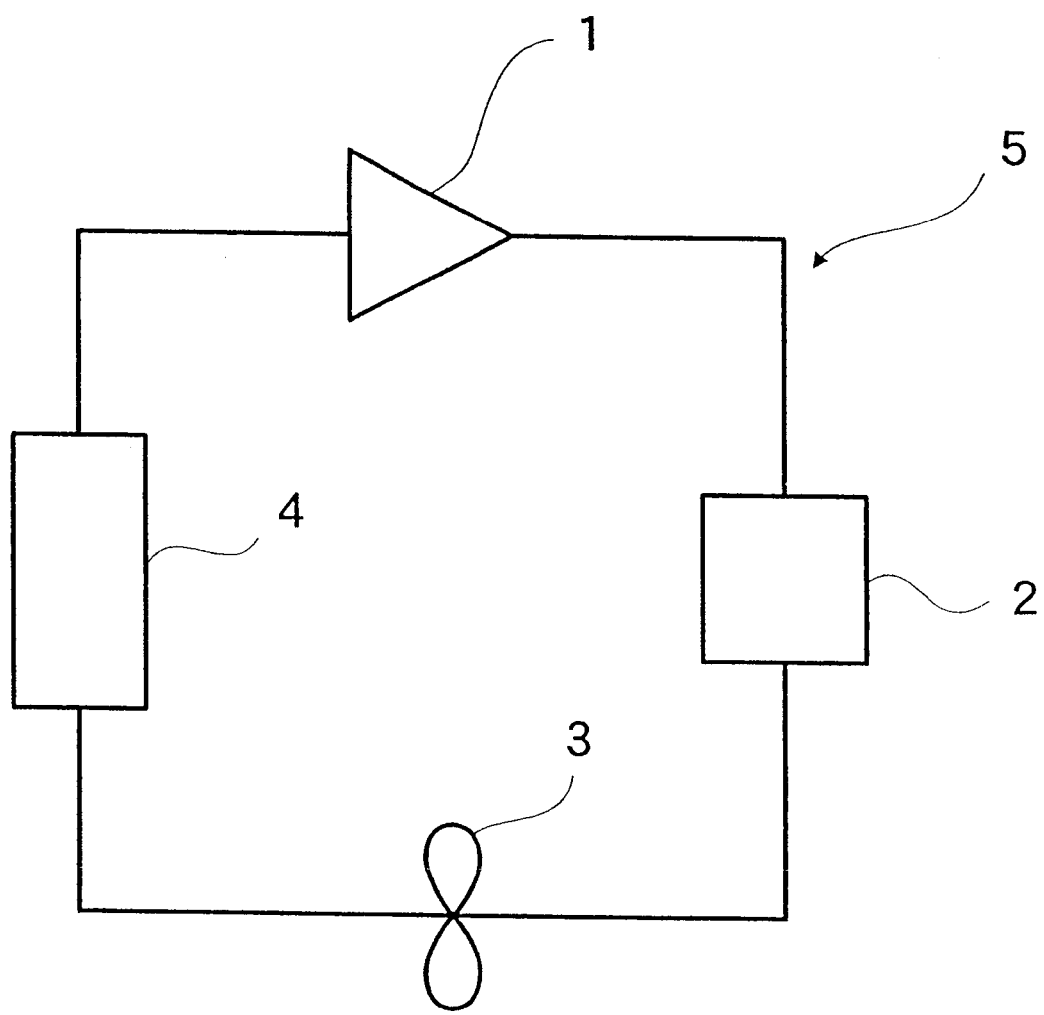
FIG. 1 is a schematic diagram of a refrigerator used in the present invention.

The components of the lubricating oil for refrigerators (hereinafter referred to as "refrigerator oil") according to the present invention will be described in further detail below.

Aliphatic Saturated Branched-chain Carboxylic Acid Monoalkyl Ester Represented by the Formula (1)

The aliphatic saturated branched-chain carboxylic acid monoalkyl ester of the present invention is represented by the foregoing formula (1) above.

In the formula (1), the total number of carbon atoms of the alkyls represented by $R^1$ and $R^2$ is preferably 2 to 13, and in such cases $R^3$ is preferably $C_3$ to $C_{12}$ straight- or branched-chain alkyl.

Also preferred are esters of the formula (1) wherein $R^1$ and $R^2$ are $C_1$ to $C_{17}$ straight-chain alkyls or $C_3$ to $C_{18}$ branched-chain alkyls.

Especially, esters of the formula (1) wherein one of $R^1$ and $R^2$ is $C_1$ to $C_5$ straight-chain alkyl or $C_3$ to $C_5$ branched-chain alkyl, and the other of $R^1$ and $R^2$ is $C_1$ to $C_{17}$ (particularly $C_1$ to $C_9$) straight-chain alkyl or $C_3$ to $C_{17}$ (particularly $C_3$ to $C_9$) branched-chain alkyl are also preferred.

The aliphatic saturated branched-chain carboxylic acid monoalkyl ester represented by the formula (1) above (hereinafter referred to as "Present ester") of the present invention can be produced by various methods. For example, such an ester can be produced by an esterification reaction of a corresponding carboxylic acid and a corresponding alcohol (dehydration condensation), a de-hydrohalogenation reaction of a corresponding carboxylic acid halide and a corresponding alcohol, an ester interchange reaction or the like.

Present ester can also be produced by hydrogenating a corresponding alkyl ester of an aliphatic unsaturated branched-chain carboxylic acid, alkenyl ester of an aliphatic saturated branched-chain carboxylic acid or alkyl or alkenyl ester of an aliphatic unsaturated branched-chain carboxylic acid.

Generally, Present ester is produced by esterification of a corresponding carboxylic acid and a corresponding alcohol. More specifically, Present ester can be produced by esterifying an aliphatic saturated branched-chain carboxylic acid represented by the formula (2)

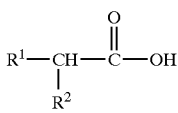

(2)

wherein $R^1$ and $R^2$ are as defined above and a monohydric alcohol represented by the formula (3)

$R^3$—OH (3)

wherein $R^3$ is as defined above by a known method, preferably with heating and stirring in the presence or absence of an esterification catalyst in an atmosphere of an inert gas such as nitrogen.

In the present invention, $R^1$ and $R^2$ are groups derived from an aliphatic saturated branched-chain carboxylic acid represented by the formula (2), and $R_1$ represents $C_1$ to $C_{18}$ straight-chain alkyl or $C_3$ to $C_{18}$ branched-chain alkyl, $R^2$ represents hydrogen, $C_1$ to $C_{18}$ straight-chain alkyl or $C_3$ to $C_{18}$ branched-chain alkyl, with the proviso that the total number of carbon atoms contained in the alkyls represented by $R^1$ and $R^2$ is 2 to 18.

Aliphatic Saturated Branched-chain Carboxylic Acid Represented by the Formula (2)

Examples of the aliphatic saturated branched-chain carboxylic acid represented by the formula (2) include isobutanoic acid (2-methylpropanoic acid), 2-methylbutanoic acid, 3-methylbutanoic acid, isohexanoic acid, 2-ethylbutanoic acid, 2,3-dimethylbutanoic acid, 2-methylpentanoic acid, isoheptanoic acid, 2-methylhexanoic acid, 2-ethylpentanoic acid, 2,4-dimethylpentanoic acid, 3-methylhexanoic acid, 5-methylhexanoic acid, isooctanoic acid, 2-ethylhexanoic acid, 2-methylheptanoic acid, 2-propylpentanoic acid, isononanoic acid, 2-methyloctanoic acid, 2-ethylheptanoic acid, 3,5,5-trimethylhexanoic acid, isodecanoic acid, 2-ethyloctanoic acid, 2-methylnonanoic acid, isoundecanoic acid, isododecanoic acid, isotridecanoic acid, isotetradecanoic acid, 2-pentylnonanoic acid, isopentadecanoic acid, isohexadecanoic acid, 2-hexyldecanoic acid, isoheptadecanoic acid, isooctadecanoic acid, isononadecanoic acid, and isoicosanoic acid.

Preferably, recommended are $C_4$ to $C_{15}$ branched-chain carboxylic acids such as isobutanoic acid, 2-methylbutanoic acid, 3-methylbutanoic acid, isohexanoic acid, 2-ethylbutanoic acid, 2,3-dimethylbutanoic acid, 2-methylpentanoic acid, isoheptanoic acid, 2-methylhexanoic acid, 2-ethylpentanoic acid, 2,4-dimethylpentanoic acid, 3-methylhexanoic acid, 5-methylhexanoic acid, isooctanoic acid, 2-ethylhexanoic acid, 2-methylheptanoic acid, 2-propylpentanoic acid, isononanoic acid, 2-methyloctanoic acid, 2-ethylheptanoic acid, 3,5,5-trimethylhexanoic acid, isodecanoic acid, 2-ethyloctanoic acid, 2-methylnonanoic acid, isoundecanoic acid, isododecanoic acid, isotridecanoic acid, isotetradecanoic acid, 2-pentylnonanoic acid, and isopentadecanoic acid.

Furthermore, mixtures of fatty acids such as Cekanoic C8 acid (product of Exxon Chemical), Cekanoic C10 acid (product of Exxon Chemical), and Cekanoic C13 acid (product of Exxon Chemical) may also be used as the aliphatic saturated branched-chain carboxylic acids represented by the formula (2).

The aforementioned aliphatic saturated branched-chain carboxylic acids represented by the formula (2) can be used singly or at least two of them may be used.

In order to obtain an ester with better hydrolytic stability and refrigerant miscibility, it is preferable to use an aliphatic saturated branched-chain carboxylic acid with two alkyls at the a position of the carboxyl group, namely a branched-chain carboxylic acid in which $R^1$ and $R^2$ represent $C_1$ to $C_{17}$ straight-chain alkyl or $C_3$ to $C_{17}$ branched-chain alkyl.

It is particularly preferable to use branched-chain carboxylic acids in which one of $R^1$ and $R^2$ is a $C_1$ to $C_5$ straight-chain alkyl or $C_3$ to $C_5$ branched-chain alkyl, and the other of $R^1$ and $R^2$ is a $C_1$ to $C_{17}$, more preferably $C_1$ to $C_9$, straight-chain alkyl or $C_3$ to $C_{17}$, more preferably $C_3$ to $C_9$, branched-chain alkyl.

Specifically, isobutanoic acid, 2-methylbutanoic acid, 2-ethylbutanoic acid, 2,3-dimethylbutanoic acid, 2-methylpentanoic acid, 2-methylhexanoic acid, 2-ethylpentanoic acid, 2,4-dimethylpentanoic acid, 2-ethylhexanoic acid, 2-methylheptanoic acid, 2-propylpentanoic acid, 2-ethyloctanoic acid, 2-methylnonanoic acid, and 2-pentylnonanoic acid are preferable. In particular, 2-ethylhexanoic acid is recommendable because of its low metal corrosion property.

Monohydric Alcohols Represented by the Formula (3)

On the other hand, $R^3$ in the present invention is a group derived from a monohydric alcohols represented by the formula (3). Examples thereof include $C_1$ to $C_{20}$ (particularly $C_3$ to $C_{12}$) straight-chain alkyl, $C_3$ to $C_{20}$ (particularly $C_3$ to $C_{12}$) branched-chain alkyl, or $C_3$ to $C_{10}$ (particularly $C_6$ to $C_8$) cycloalkyl.

Specific examples of $R^3$ include isopropyl, isobutyl, sec-butyl, tert-butyl, isopentyl, isohexyl, isoheptyl, 2-methylhexyl, 2-ethylhexyl, 1-methylheptyl, 2-methylheptyl, isooctyl, isononyl, 3,5,5-trimethylhexyl, 2,6-dimethyl-4-heptyl, isodecyl, isoundecyl, isododecyl, isotridecyl, isotetradecyl, isopentadecyl, isohexadecyl, isoheptadecyl, isooctadecyl, isononadecyl, isoicosyl, methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-icosyl, cyclohexyl, methylcyclohexyl, and dimethylcyclohexyl. Particularly preferred examples of $R^3$ include $C_3$ to $C_{12}$ straight- or branched-chain (particularly branched) alkyl or $C_6$ to $C_8$ cycloalkyl (particularly $C_3$ to $C_{12}$ straight- or branched-chain alkyl), such as isobutyl, sec-butyl, cyclohexyl, n-heptyl, isoheptyl, 2-ethylhexyl, 1-methylheptyl, isooctyl, isononyl, 3,5,5-trimethylhexyl, 2,6-dimethyl-4-heptyl, isodecyl and isoundecyl.

Examples of monohydric alcohols represented by the formula (3) include $C_1$ to $C_{20}$ straight-chain alcohols, $C_3$ to $C_{20}$ branched-chain alcohols, and $C_3$ to $C_{10}$ cycloalcohols.

Specific examples of straight-chain alcohols include methanol, ethanol, n-propanol, n-butanol, n-pentanol, n-hexanol, n-heptanol, n-octanol, n-nonanol, n-decanol, n-undecanol, n-dodecanol, n-tridecanol, n-tetradecanol, n-pentadecanol, n-hexadecanol, n-octadecanol, n-nonadecanol, n-icosanol and the like.

Specific examples of branched-chain alcohols include isopropanol, isobutanol, sec-butanol, tert-butanol, isopentanol, isohexanol, isoheptanol, 2-methylhexanol, 2-ethylhexanol, 1-methylheptanol, 2-methylheptanol, isooctanol, isononanol, 3,5,5-trimethylhexanol, 2,6-dimethyl-4-heptanol, isodecanol, isoundecanol, isododecanol, isotridecanol, isotetradecanol, isopentadecanol, isohexadecanol, isooctadecanol, isononadecanol, iso-icosanol and the like.

Specific examples of cycloalcohols include cyclohexanol, methylcyclohexanol, dimethylcyclohexanol and so on.

Among the above alcohols, straight-chain alcohols and cycloalcohols are preferred in terms of better lubricity, and preferred examples thereof include $C_3$ to $C_{12}$ straight-chain alcohols and $C_6$ to $C_8$ cycloalcohols, such as n-propanol, n-butanol, n-pentanol, n-hexanol, n-heptanol, n-octanol, n-nonanol, n-decanol, n-undecanol, n-dodecanol, and cyclohexanol.

In terms of better refrigerant miscibility and hydrolytic stability, on the other hand, branched-chain alcohols are preferred. Preferred examples thereof include $C_3$ to $C_{12}$ branched-chain alcohols such as isopropanol, isobutanol, sec-butanol, isoheptanol, 2-ethylhexanol, 1-methylheptanol, isooctanol, isononanol, 3,5,5-trimethylhexanol, 2,6-dimethyl-4-heptanol, isodecanol, and isoundecanol.

In view of the balance of the physical properties required of refrigerator oils, such as lubricity, refrigerant miscibility, hydrolytic stability and electrical insulating properties, more preferable as the alcohols represented by the formula (3) are $C_3$ to $C_{12}$ straight-chain or branched-chain (preferably branched-chain) alcohols or $C_6$ to $C_8$ cycloalcohols, such as isopropanol, isobutanol, sec-butanol, cyclohexanol, n-heptanol, isoheptanol, 2-ethylhexanol, 1-methylheptanol, isooctanol, isononanol, 3,5,5-trimethylhexanol, 2,6-dimethyl-4-heptanol, isodecanol and isoundecanol.

Alcohols represented by the formula (3) can be subjected to esterification reaction individually or in the form of a mixture of at least two of them.

Specific examples of such a mixture of alcohols include isobutanol/2-ethylhexanol, isobutanol/n-octanol, isobutanol/isononanol, isobutanol/3,5,5-trimethylhexanol, isobutanol/isodecanol, isobutanol/n-decanol, isobutanol/n-undecanol, isobutanol/isoundecanol, isobutanol/n-dodecanol, 2-ethylhexanol/n-octanol, 2-ethylhexanol/isononanol, 2-ethylhexanol/3,5,5-trimethylhexanol, 2-ethylhexanol/isodecanol, 2-ethylhexanol/n-decanol, 2-ethylhexanol/n-undecanol, 2-ethylhexanol/isoundecanol, 2-ethylhexanol/n-dodecanol, n-octanol/isononanol, n-octanol/3,5,5-trimethylhexanol, n-octanol/isodecanol, n-octanol/n-decanol, n-octanol/n-undecanol, n-octanol/isoundecanol, n-octanol/n-dodecanol, isononanol/3,5,5-trimethylhexanol, isononanol/isodecanol, isononanol/n-decanol, isononanol/n-undecanol, isononanol/isoundecanol, isononanol/n-dodecanol, 3,5,5-trimethylhexanol/isodecanol, 3,5,5-trimethylhexanol/n-decanol, 3,5,5-trimethylhexanol/n-undecanol, 3,5,5-trimethylhexanol/isoundecanol, and 3,5,5-trimethylhexanol/n-dodecanol.

When at least two alcohols, particularly two alcohols, are used in admixture, they are mixed in a molar ratio of 95:5 to 5:95, more preferably 90:10 to 10:90, and even more preferably 70:30 to 30:70.

When a balance of refrigerant miscibility, hydrolytic stability and lubricity is particularly important, the combined use of a straight-chain alcohol and a branched-chain alcohol is preferred.

When a straight-chain alcohol is used in combination with a branched-chain alcohol, it is recommended that the content of a $C_{12}$ to $C_{20}$ straight-chain alcohols be 5 to 50 mol % of the total alcohol for the sake of better refrigerant miscibility and hydrolytic stability.

Esterification

In carrying out the esterification reaction, the amounts of the starting materials are such that the alcohol represented by the formula (3) is used, for example, in an amount of 1 to 1.5 equivalents, preferably 1.05 to 1.2 equivalents, per equivalent of the carboxylic acid represented by the formula (2).

The present ester can also be obtained by an ester interchange reaction in which, in place of the carboxylic acid represented by the formula (2) or the alcohol represented by the formula (3), a lower alcohol ester of said carboxylic acid and/or a $C_1$ to $C_4$ lower alkanoic acid ester of an alcohol represented by the formula (3) such as an acetic acid ester or a propionic acid ester of said alcohol.

It is preferable that the acid and alcohol components to be used in the esterification reaction are as free of impurities as possible. Impurities include metal compounds, hetero atom-containing compounds (such as sulfur-containing compounds, nitrogen-containing compounds, and phosphorus-containing compounds), and oxygen-containing compounds (such as peroxides and carbonyl compounds).

Examples of esterification catalyst include Lewis acids, alkali metals, and sulfonic acids. Specific examples of Lewis acids include aluminum derivatives, tin derivatives, and titanium derivatives. Specific examples of alkali metals include sodium alkoxides and potassium alkoxides. Specific examples of sulfonic acids include para-toluenesulfonic acid, methanesulfonic acid, and sulfuric acid. Acidic ion exchange resins can also be used. Among them, $C_3$ to $C_8$ tetraalkyl titanates, titanium oxide, sodium $C_1$ to $C_4$ alkoxides, sodium hydroxide, $C_3$ to $C_{12}$ tin fatty acids, and tin oxide are preferred. These may be used, for example, in an amount of about 0.05 to 1 wt % relative to the total amount of the carboxylic acid represented by the formula (2) and the alcohol represented by the formula (3).

The esterification temperature may be 100 to 230° C., and the reaction is normally completed within 3 to 30 hours.

In the esterification, a water-entraining agent such as benzene, toluene, xylene and cyclohexane can be used to accelerate the distillation of the water produced by the reaction.

Since the water absorption, hydrolytic stability, and electrical insulating properties will be adversely affected in the event that oxygen-containing compounds such as oxides, peroxides and carbonyl compounds are formed as a result of the oxidative degradation of the starting materials, the ester formed and the organic solvent (water-entraining agent) during esterification, the reaction is preferably carried out in a nitrogen or other inert gas atmosphere or in an inert gas stream.

After the completion of the reaction, the excess starting materials are distilled off at reduced or normal pressure. The ester formed can then be purified by a conventional purification method, such as liquid-liquid extraction, distillation under reduced pressure, adsorption by treatment with activated carbon and so forth.

The ester that is obtained may sometimes be contaminated by various impurities depending on the production process.

Such impurities include acidic compounds, metal compounds (organometal compounds and inorganic metal compounds), hetero atom-containing compounds (such as sulfur-containing compounds, nitrogen-containing compounds and phosphorus-containing compounds), and oxygen-containing compounds (such as peroxides and carbonyl compounds). Such impurities lead to poor hydrolytic stability, electric insulating properties and thermal stability, and can also cause corrosion of metal components or production of sludge.

Examples of processes for removing the acidic compounds include separation of unreacted starting acids by distillation, thorough neutralization with alkalis and thorough washing with water, and purification with adsorbents that are effective for removing acids. As to the processes for removing metal compounds, metal catalysts are removed, optionally after having been hydrolyzed, by filtration, optionally followed by purification treatment of the product with adsorbents that are effective for removing metals. Alkali metals used for neutralization can be removed by thorough washing with water, optionally followed by purification of the product with an adsorbent that is effective for removing metals. As to the processes for removing hetero atom compounds, there may be mentioned a sufficient neutralization with use of alkalis and washing with water for removing sulfur-containing catalysts and phosphorus-containing catalysts, and purification with an adsorbent that is effective for removing hetero atoms. Examples of processes for removing peroxides and carbonyl compounds include reduction treatment with metal hydrides such as sodium borohydride and lithium aluminum hydride.

Specific examples of the adsorbents used in such purification include natural and synthetic adsorbents, such as activated carbon, activated alumina, silica gel, silica alumina, activated clay, zeolites, magnesia, calcia, diatomaceous earth and hydrotalcite, as well as non-sulfonic acid-based ion exchange resins, synthetic hydrotalcites and similar synthetic adsorbents. Although the amount thereof to be used will vary depending on the type of adsorbent, an amount of 0.01 to 5 wt %, preferably 0.05 to 5 wt %, relative to the theoretical yield of the ester is usually recommended.

Particularly, an ester purified by using one or more adsorbents selected from the group consisting of activated carbon, activated alumina, silica gel, activated clay, zeolites, hydrotalcite, non-sulfonic acid-based ion exchange resins and synthetic hydrotalcites at room temperature to 110° C., preferably room temperature to 90° C., has the following properties a) through h) and are especially suitable as lubricating oils for refrigerators.

a) The total acid number of the present esters is recommendably not more than 0.1 mgKOH/g, preferably not more than 0.05 mgKOH/g, and even more preferably not more than 0.03 mgKOH/g. A total acid number of not more than 0.1 mgKOH/g will make it easier to achieve good hydrolytic stability, with minimal metal corrosion property.

b) Ash content or sulfated ash content as defined in JIS-K-2272 of the present esters is recommendably not more than 30 ppm, preferably not more than 10 ppm, and even more preferably not more than 5 ppm. An ash content or sulfated ash content of not more than 30 ppm will easily allow better hydrolytic stability and thermal stability to be achieved.

c) The present esters recommendably have a sulfur content of not more than 50 ppm, preferably not more than 30 ppm, and even more preferably not more than 10 ppm. A sulfur content of not greater than 50 ppm will readily allow better hydrolytic stability and thermal stability to be achieved.

d) The present esters recommendably have a phosphorus content of not more than 50 ppm, preferably not more than 30 ppm, and even more preferably not more than 10 ppm. A phosphorus content not greater than 50 ppm will readily allow better hydrolytic stability and thermal stability to be achieved.

e) The present esters recommendably have a hydroxyl value of not more than 5 mgKOH/g, preferably not more than 3 mgKOH/g. A hydroxyl value of not greater than 5 mgKOH/g will readily result in an ester with less hygroscopicity, and will allow better hydrolytic stability and electrical insulating properties to be achieved.

f) The present esters recommendably have a peroxide value of not more than 1.0 meq/kg, preferably not more than 0.5 meq/kg. A peroxide value of not greater than 1.0 meq/kg will tend to result in better thermal stability.

g) The present ester recommendably have a carbonyl value of not more than 5.0, preferably not more than 3.0, and even more preferably not more than 1.0. A carbonyl value of not greater than 5.0 will result in better thermal stability.

h) The hue of the present esters are recommendably such that they have a Hazen number of not greater than 100, preferably not greater than 50, and even more preferably not greater than 30. A Hazen number of not greater than 100 will result in better thermal stability.

Present Ester

Specific examples of present esters obtained in the manner described above include at least one member selected from the group consisting of isopropyl isobutanoate, isobutyl isobutanoate, (sec-butyl) isobutanoate, isopentyl isobutanoate, cyclohexyl isobutanoate, isoheptyl isobutanoate, (2-ethylhexyl) isobutanoate, (1-methylheptyl) isobutanoate, isooctyl isobutanoate, isononyl isobutanoate, (3,5,5-trimethylhexyl) isobutanoate, (2,6-dimethyl-4-heptyl) isobutanoate, isodecyl isobutanoate, isoundecyl isobutanoate, (n-propyl) isobutanoate, (n-butyl) isobutanoate, (n-pentyl) isobutanoate, (n-hexyl) isobutanoate, (n-heptyl) isobutanoate, (n-octyl) isobutanoate, (n-nonyl) isobutanoate, (n-decyl) isobutanoate, (n-undecyl) isobutanoate, (n-dodecyl) isobutanoate, isopropyl 2-methylbutanoate, isobutyl 2-methylbutanoate, (sec-butyl) 2-methylbutanoate, isopentyl 2-methylbutanoate, cyclohexyl 2-methylbutanoate, isoheptyl 2-methylbutanoate, (2-ethylhexyl) 2-methylbutanoate, (1-methylheptyl) 2-methylbutanoate, isooctyl 2-methylbutanoate, isononyl 2-methylbutanoate, (3,5,5-trimethylhexyl) 2-methylbutanoate, (2,6-dimethyl-4-heptyl) 2-methylbutanoate, isodecyl 2-methylbutanoate, isoundecyl 2-methylbutanoate, (n-propyl) 2-methylbutanoate, (n-butyl) 2-methylbutanoate, (n-pentyl) 2-methylbutanoate, (n-hexyl) 2-methylbutanoate, (n-heptyl) 2-methylbutanoate, (n-octyl) 2-methylbutanoate, (n-nonyl) 2-methylbutanoate, (n-decyl) 2-methylbutanoate, (n-undecyl) 2-methylbutanoate, (n-dodecyl) 2-methylbutanoate, isopropyl 2-ethylbutanoate, isobutyl 2-ethylbutanoate, (sec-butyl) 2-ethylbutanoate, isopentyl 2-ethylbutanoate, cyclohexyl 2-ethylbutanoate, isoheptyl 2-ethylbutanoate, (2-ethylhexyl) 2-ethylbutanoate, (1-methylheptyl) 2-ethylbutanoate, isooctyl 2-ethylbutanoate, isononyl 2-ethylbutanoate, (3,5,5-trimethylhexyl) 2-ethylbutanoate, (2,6-dimethyl-4-heptyl) 2-ethylbutanoate, isodecyl 2-ethylbutanoate, isoundecyl 2-ethylbutanoate, (n-propyl) 2-ethylbutanoate, (n-butyl) 2-ethylbutanoate, (n-pentyl) 2-ethylbutanoate, (n-hexyl) 2-ethylbutanoate, (n-heptyl) 2-ethylbutanoate, (n-octyl) 2-ethylbutanoate, (n-nonyl) 2-ethylbutanoate, (n-decyl) 2-ethylbutanoate, (n-undecyl) 2-ethylbutanoate, (n-dodecyl)

2-ethylbutanoate, isopropyl 2,3-dimethylbutanoate, isobutyl 2,3-dimethylbutanoate, (sec-butyl) 2,3-dimethylbutanoate, isopentyl 2,3-dimethylbutanoate, cyclohexyl 2,3-dimethylbutanoate, isoheptyl 2,3-dimethylbutanoate, (2-ethylhexyl) 2,3-dimethylbutanoate, (1-methylheptyl) 2,3-dimethylbutanoate, isooctyl 2,3-dimethylbutanoate, isononyl 2,3-dimethylbutanoate, (3,5,5-trimethylhexyl) 2,3-dimethylbutanoate, (2,6-dimethyl-4-heptyl) 2,3-dimethylbutanoate, isodecyl 2,3-dimethylbutanoate, isoundecyl 2,3-dimethylbutanoate, (n-propyl) 2,3-dimethylbutanoate, (n-butyl) 2,3-dimethylbutanoate, (n-pentyl) 2,3-dimethylbutanoate, (n-hexyl) 2,3-dimethylbutanoate, (n-heptyl) 2,3-dimethylbutanoate, (n-octyl) 2,3-dimethylbutanoate, (n-nonyl) 2,3-dimethylbutanoate, (n-decyl) 2,3-dimethylbutanoate, (n-undecyl) 2,3-dimethylbutanoate, (n-dodecyl) 2,3-dimethylbutanoate, isopropyl 2-methylpentanoate, isobutyl 2-methylpentanoate, (sec-butyl) 2-methylpentanoate, isopentyl 2-methylpentanoate, cyclohexyl 2-methylpentanoate, isoheptyl 2-methylpentanoate, (2-ethylhexyl) 2-methylpentanoate, (1-methylheptyl) 2-methylpentanoate, isooctyl 2-methylpentanoate, isononyl 2-methylpentanoate, (3,5,5-trimethylhexyl) 2-methylpentanoate, (2,6-dimethyl-4-heptyl) 2-methylpentanoate, isodecyl 2-methylpentanoate, isoundecyl 2-methylpentanoate, (n-propyl) 2-methylpentanoate, (n-butyl) 2-methylpentanoate, (n-pentyl) 2-methylpentanoate, (n-hexyl) 2-methylpentanoate, (n-heptyl) 2-methylpentanoate, (n-octyl) 2-methylpentanoate, (n-nonyl) 2-methylpentanoate, (n-decyl) 2-methylpentanoate, (n-undecyl) 2-methylpentanoate, (n-dodecyl) 2-methylpentanoate, isopropyl 2-methylhexanoate, isobutyl 2-methylhexanoate, (sec-butyl) 2-methylhexanoate, isopentyl 2-methylhexanoate, cyclohexyl 2-methylhexanoate, isoheptyl 2-methylhexanoate, (2-ethylhexyl) 2-methylhexanoate, (1-methylheptyl) 2-methylhexanoate, isooctyl 2-methylhexanoate, isononyl 2-methylhexanoate, (3,5,5-trimethylhexyl) 2-methylhexanoate, (2,6-dimethyl-4-heptyl) 2-methylhexanoate, isodecyl 2-methylhexanoate, isoundecyl 2-methylhexanoate, (n-propyl) 2-methylhexanoate, (n-butyl) 2-methylhexanoate, (n-pentyl) 2-methylhexanoate, (n-hexyl) 2-methylhexanoate, (n-heptyl) 2-methylhexanoate, (n-octyl) 2-methylhexanoate, (n-nonyl) 2-methylhexanoate, (n-decyl) 2-methylhexanoate, (n-undecyl) 2-methylhexanoate, (n-dodecyl) 2-methylhexanoate, isopropyl 2-ethylpentanoate, isobutyl 2-ethylpentanoate, (sec-butyl) 2-ethylpentanoate, isopentyl 2-ethylpentanoate, cyclohexyl 2-ethylpentanoate, isoheptyl 2-ethylpentanoate, (2-ethylhexyl) 2-ethylpentanoate, (1-methylheptyl) 2-ethylpentanoate, isooctyl 2-ethylpentanoate, isononyl 2-ethylpentanoate, (3,5,5-trimethylhexyl) 2-ethylpentanoate, (2,6-dimethyl-4-heptyl) 2-ethylpentanoate, isodecyl 2-ethylpentanoate, isoundecyl 2-ethylpentanoate, (n-propyl) 2-ethylpentanoate, (n-butyl) 2-ethylpentanoate, (n-pentyl) 2-ethylpentanoate, (n-hexyl) 2-ethylpentanoate, (n-heptyl) 2-ethylpentanoate, (n-octyl) 2-ethylpentanoate, (n-nonyl) 2-ethylpentanoate, (n-decyl) 2-ethylpentanoate, (n-undecyl) 2-ethylpentanoate, (n-dodecyl) 2-ethylpentanoate, isopropyl 2,4-dimethylpentanoate, isobutyl 2,4-dimethylpentanoate, (sec-butyl) 2,4-dimethylpentanoate, isopentyl 2,4-dimethylpentanoate, cyclohexyl 2,4-dimethylpentanoate, isoheptyl 2,4-dimethylpentanoate, (2-ethylhexyl) 2,4-dimethylpentanoate, (1-methylheptyl) 2,4-dimethylpentanoate, isooctyl 2,4-dimethylpentanoate, isononyl 2,4-dimethylpentanoate, (3,5,5-trimethylhexyl) 2,4-dimethylpentanoate, (2,6-dimethyl-4-heptyl) 2,4-dimethylpentanoate, isodecyl 2,4-dimethylpentanoate, isoundecyl 2,4-dimethylpentanoate, (n-propyl) 2,4-dimethylpentanoate, (n-butyl) 2,4-dimethylpentanoate, (n-pentyl) 2,4-dimethylpentanoate, (n-hexyl) 2,4-dimethylpentanoate, (n-heptyl) 2,4-dimethylpentanoate, (n-octyl) 2,4-dimethylpentanoate, (n-nonyl) 2,4-dimethylpentanoate, (n-decyl) 2,4-dimethylpentanoate, (n-undecyl) 2,4-dimethylpentanoate, (n-dodecyl) 2,4-dimethylpentanoate, isopropyl 2-ethylhexanoate, isobutyl 2-ethylhexanoate, (sec-butyl) 2-ethylhexanoate, isopentyl 2-ethylhexanoate, cyclohexyl 2-ethylhexanoate, isoheptyl 2-ethylhexanoate, (2-ethylhexyl) 2-ethylhexanoate, (1-methylheptyl) 2-ethylhexanoate, isooctyl 2-ethylhexanoate, isononyl 2-ethylhexanoate, (3,5,5-trimethylhexyl) 2-ethylhexanoate, (2,6-dimethyl-4-heptyl) 2-ethylhexanoate, isodecyl 2-ethylhexanoate, isoundecyl 2-ethylhexanoate, (n-propyl) 2-ethylhexanoate, (n-butyl) 2-ethylhexanoate, (n-pentyl) 2-ethylhexanoate, (n-hexyl) 2-ethylhexanoate, (n-heptyl) 2-ethylhexanoate, (n-octyl) 2-ethylhexanoate, (n-nonyl) 2-ethylhexanoate, (n-decyl) 2-ethylhexanoate, (n-undecyl) 2-ethylhexanoate, (n-dodecyl) 2-ethylhexanoate, isopropyl 2-methylheptanoate, isobutyl 2-methylheptanoate, (sec-butyl) 2-methylheptanoate, isopentyl 2-methylheptanoate, cyclohexyl 2-methylheptanoate, isoheptyl 2-methylheptanoate, (2-ethylhexyl) 2-methylheptanoate, (1-methylheptyl) 2-methylheptanoate, isooctyl 2-methylheptanoate, isononyl 2-methylheptanoate, (3,5,5-trimethylhexyl) 2-methylheptanoate, (2,6-dimethyl-4-heptyl) 2-methylheptanoate, isodecyl 2-methylheptanoate, isoundecyl 2-methylheptanoate, (n-propyl) 2-methylheptanoate, (n-butyl) 2-methylheptanoate, (n-pentyl) 2-methylheptanoate, (n-hexyl) 2-methylheptanoate, (n-heptyl) 2-methylheptanoate, (n-octyl) 2-methylheptanoate, (n-nonyl) 2-methylheptanoate, (n-decyl) 2-methylheptanoate, (n-undecyl) 2-methylheptanoate, (n-dodecyl) 2-methylheptanoate, isopropyl 2-propylpentanoate, isobutyl 2-propylpentanoate, (sec-butyl) 2-propylpentanoate, isopentyl 2-propylpentanoate, cyclohexyl 2-propylpentanoate, isoheptyl 2-propylpentanoate, (2-ethylhexyl) 2-propylpentanoate, (1-methylheptyl) 2-propylpentanoate, isooctyl 2-propylpentanoate, isononyl 2-propylpentanoate, (3,5,5-trimethylhexyl) 2-propylpentanoate, (2,6-dimethyl-4-heptyl) 2-propylpentanoate, isodecyl 2-propylpentanoate, isoundecyl 2-propylpentanoate, (n-propyl) 2-propylpentanoate, (n-butyl) 2-propylpentanoate, (n-pentyl) 2-propylpentanoate, (n-hexyl) 2-propylpentanoate, (n-heptyl) 2-propylpentanoate, (n-octyl) 2-propylpentanoate, (n-nonyl) 2-propylpentanoate, (n-decyl) 2-propylpentanoate, (n-undecyl) 2-propylpentanoate, (n-dodecyl) 2-propylpentanoate, isopropyl 2-ethyloctanoate, isobutyl 2-ethyloctanoate, (sec-butyl) 2-ethyloctanoate, isopentyl 2-ethyloctanoate, cyclohexyl 2-ethyloctanoate, isoheptyl 2-ethyloctanoate, (2-ethylhexyl) 2-ethyloctanoate, (1-methylheptyl) 2-ethyloctanoate, isooctyl 2-ethyloctanoate, isononyl 2-ethyloctanoate, (3,5,5-trimethylhexyl) 2-ethyloctanoate, (2,6-dimethyl-4-heptyl) 2-ethyloctanoate, isodecyl 2-ethyloctanoate, isoundecyl 2-ethyloctanoate, (n-propyl) 2-ethyloctanoate, (n-butyl) 2-ethyloctanoate, (n-pentyl) 2-ethyloctanoate, (n-hexyl) 2-ethyloctanoate, (n-heptyl) 2-ethyloctanoate, (n-octyl) 2-ethyloctanoate, (n-nonyl) 2-ethyloctanoate, (n-decyl) 2-ethyloctanoate, (n-undecyl) 2-ethyloctanoate, (n-dodecyl) 2-ethyloctanoate, isopropyl 2-methylnonanoate, isobutyl 2-methylnonanoate, (sec-butyl) 2-methylnonanoate, isopentyl 2-methylnonanoate, cyclohexyl 2-methylnonanoate, isoheptyl 2-methylnonanoate, (2-ethylhexyl) 2-methylnonanoate, (1-methylheptyl) 2-methylnonanoate, isooctyl 2-methylnonanoate, isononyl 2-methylnonanoate, (3,5,5-trimethylhexyl) 2-methylnonanoate, (2,6-dimethyl-4-heptyl) 2-methylnonanoate, isodecyl 2-methylnonanoate, isoundecyl 2-methylnonanoate, (n-propyl) 2-methylnonanoate, (n-butyl) 2-methylnonanoate, (n-pentyl) 2-methylnonanoate, (n-hexyl) 2-methylnonanoate, (n-heptyl) 2-methylnonanoate, (n-octyl) 2-methylnonanoate, (n-nonyl) 2-methylnonanoate, (n-decyl) 2-methylnonanoate, (n-undecyl) 2-methylnonanoate, and (n-dodecyl) 2-methylnonanoate.

Among the above esters, recommendable in view of better hydrolytic stability and lower metal corrosion property are $C_3$ to $C_{12}$ straight-chain or branched-chain alkyl esters or $C_6$ to $C_8$ cycloalkyl esters of 2-ethylhexanoic acid, such as isopropyl 2-ethylhexanoate, isobutyl 2-ethylhexanoate, (sec-butyl) 2-ethylhexanoate, isopentyl 2-ethylhexanoate, cyclohexyl 2-ethylhexanoate, isoheptyl 2-ethylhexanoate, (2-ethylhexyl) 2-ethylhexanoate, (1-methylheptyl) 2-ethylhexanoate, isooctyl 2-ethylhexanoate, isononyl 2-ethylhexanoate, (3,5,5-trimethylhexyl) 2-ethylhexanoate, (2,6-dimethyl-4-heptyl) 2-ethylhexanoate, isodecyl 2-ethylhexanoate, isoundecyl 2-ethylhexanoate, (n-propyl) 2-ethylhexanoate, (n-butyl) 2-ethylhexanoate, (n-pentyl) 2-ethylhexanoate, (n-hexyl) 2-ethylhexanoate, (n-heptyl) 2-ethylhexanoate, (n-octyl) 2-ethylhexanoate, (n-nonyl) 2-ethylhexanoate, (n-decyl) 2-ethylhexanoate, (n-undecyl) 2-ethylhexanoate, (n-dodecyl) 2-ethylhexanoate and the like.

Further, among such 2-ethylhexanoate esters, it is recommended, in view of excellent refrigerant miscibility and electrical insulating properties, to use at least one member selected from the group consisting of isopropyl 2-ethylhexanoate, isobutyl 2-ethylhexanoate, (sec-butyl) 2-ethylhexanoate, cyclohexyl 2-ethylhexanoate, (n-heptyl) 2-ethylhexanoate, isoheptyl 2-ethylhexanoate, (2-ethylhexyl) 2-ethylhexanoate, (1-methylheptyl) 2-ethylhexanoate, isooctyl 2-ethylhexanoate, isononyl 2-ethylhexanoate, (3,5,5-trimethylhexyl) 2-ethylhexanoate, (2,6-dimethyl-4-heptyl) 2-ethylhexanoate, isodecyl 2-ethylhexanoate and isoundecyl 2-ethylhexanoate.

The esters of the present invention recommendably have a volume resistivity of $1 \times 10^{11}$ Ω·cm or more, preferably $1 \times 10^{12}$ Ω·cm or more, and more preferably $1 \times 10^{13}$ Ω·cm or more. A volume resistivity of less than $10^{11}$ Ω·cm is less likely to result in good electrical insulating properties.

Preferably, the ester of the present invention separates from refrigerant at a temperature of 10° C. or lower, particularly 0° C. or lower, and even more preferably −10° C. or lower.

The esters of the present invention have a kinematic viscosity of 0.5 to 15 mm²/s at 40° C., preferably 0.5 to 10 mm²/s at 40° C.

In general, exposing the ester to elevated temperatures in the presence of water will result in decomposition into the corresponding carboxylic acid and alcohol. It is known that refrigerator lubricating oils are exposed to very high temperatures caused by friction during the operation of compressors. The presence of water in the refrigerator system might result in the hydrolysis of the ester serving as the lubricating oil. It is considered that minimal increase in the total acid number following heat treatment of the ester is indicative of suppressed hydrolysis and higher stability. When compared by this method, polyol esters which can be used as low-viscosity refrigerator lubricating oils suffer from greater increase in the total acid number, greater change in the weight of iron piece immersed in the oil, and changes in appearance due to surface corrosion of metal such as iron, copper and aluminum.

By contrast, the present esters are sufficiently resistant to hydrolysis so that there is less increase in acid number and less change in appearance due to surface corrosion of iron and copper.

Combined Use of Present Ester and Other Base Oil

The lubricating oil for refrigerators according to the present invention can be mixed with at least one other base oil (henceforth, "combination base oil" to prepare a lubricating oil for refrigerators, provided that the effects of the present invention are not thereby compromised.

The aliphatic saturated branched-chain carboxylic acid monoalkyl ester (a) represented by the formula (1) and the combination base oil (b) are used in a weight ratio of (a):(b)=0.5:99.5 to 99.5:0.5, preferably (a):(b)=5:95 to 95:5, and even more preferably (a):(b)=15:85 to 85:15.

Examples of the combination base oils include one or more members selected from the group consisting of (b1) hydrocarbon oils, (b2) organic acid esters other than the present ester, (b3) polyalkylene glycols, (b4) polyvinyl ethers, (b5) polyphenyl ethers, (b6) alkyl phenyl ethers, and (b7) silicone oils. These will be described below.

(b1) Hydrocarbon Oils

Examples of hydrocarbon oils include refined petroleum products such as (b1-1) hydrocarbon oils (mineral oils), (b1-2) poly-α-olefins, (b1-3) polybutenes, (b1-4) alkylbenzenes, (b1-5) alkylnaphthalenes, (b1-6) isomerized hydrocarbons obtained by the Fischer-Tropsch process, and similar synthetic hydrocarbon oils.

(b1-1) Examples of mineral oils include solvent-refined mineral oils, hydrotreated mineral oils, and wax isomerized oils, which usually have a kinematic viscosity (at 100° C.) of 1.0 to 40 mm²/s, and preferably 2.0 to 30 mm²/s.

(b1-2) Examples of poly-α-olefins include $C_2$ to $C_{16}$ α-olefin (such as ethylene, propylene, 1-butene, 1-hexene, 1-octene, 1-decene, 1-dodecene, 1-tetradecen or 1-hexadecene, etc.) polymers and copolymers having a kinematic viscosity (at 100° C.) of 1.0 to 40 mm2/s and a viscosity index of at least 100. Particularly, those having a kinematic viscosity (at 100° C.) of 2.0 to 30 mm²/s and a viscosity index of at least 120 are preferred.

(b1-3) Examples of polybutenes include those obtained by the polymerization of isobutylene and those obtained by the copolymerization of isobutylene with n-butylene. There may be mentioned a wide range of those having a kinematic viscosity (at 100° C.) of between 2.0 to 6000 mm²/s.

(b1-4) Examples of alkyl benzenes include $C_1$ to $C_{40}$ straight-chain or branched-chain alkyl group-substituted monoalkyl benzenes, dialkyl benzenes, trialkyl benzenes, and tetraalkyl benzenes, etc. which have a molecular weight of 200 to 450. Those having one or two alkyl groups wherein the alkyl has 1 to 20 carbon atoms are preferred, because of their longer-lasting stability as a refrigerator oil. Branched-chain alkyl groups are preferred for refrigerator oils with longer-lasting stability. Specific alkyl groups include methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-icosyl, isopropyl, isobutyl, isopentyl, isohexyl, isoheptyl, isooctyl, isononyl, isodecyl, isoundecyl, isodecyl, isotridecyl, isotetradecyl, isopentadecyl, isohexadecyl, isoheptadecyl, isooctadecyl, isononadecyl and isoeicosyl.

(b1-5) Examples of alkylnaphthalenes include monoalkylnaphthalenes and dialkylnaphthalenes wherein the alkyl is $C_1$ to $C_{30}$ straight- or branched-chain alkyl.

(b2) Organic Acid Esters Other Than the Present Ester

Examples of organic acid esters other than the present ester include (b2-1) aliphatic saturated straight-chain carboxylic acid monoesters, (b2-2) aliphatic dibasic acid esters, (b2-3) aromatic polycarboxylic acid esters, (b2-4) alicyclic dicarboxylic acid esters, (b2-5) fatty acid polyol esters, and (b2-6) other esters.

(b2-1) Examples of aliphatic saturated straight-chain carboxylic acid monoesters include full esters of $C_3$ to $C_{18}$ straight-chain monocarboxylic acids and $C_3$ to $C_{22}$ straight- or branched-chain saturated or unsaturated aliphatic alcohols.

(b2-2) Examples of aliphatic dibasic acid esters include full esters of $C_6$ to $C_{12}$ aliphatic dicarboxylic acid such as adipic acid, azelaic acid, sebacic acid or dodecanedioic acid, and a $C_3$ to $C_{22}$ straight- or branched-chain saturated or unsaturated aliphatic alcohol.

(b2-3) Examples of aromatic polycarboxylic acid esters include full esters of an aromatic polycarboxylic acid or its anhydride such as phthalic acid, isophthalic acid, terephthalic acid or trimellitic acid, or pyromellitic acid, and a $C_3$ to $C_{22}$ straight- or branched-chain saturated or unsaturated aliphatic alcohol.

Preferred examples include full esters of phthalic acid and a $C_1$ to $C_{18}$ straight- or branched-chain saturated or unsaturated aliphatic alcohol or a $C_3$ to $C_{10}$ cycloalcohol. Examples of phthalic acid esters include dimethyl phthalate, diethyl phthalate, di(n-propyl) phthalate, di(n-butyl) phthalate, di(n-pentyl) phthalate, di(n-hexyl) phthalate, di(n-heptyl) phthalate, di(n-octyl) phthalate, di(n-nonyl) phthalate, di(n-decyl) phthalate, di(n-undecyl) phthalate, di(n-dodecyl) phthalate, di(n-tridecyl) phthalate, di(n-tetradecyl) phthalate, di(n-pentadecyl) phthalate, di(n-hexadecyl) phthalate, di(n-heptadecyl) phthalate, di(n-octadecyl) phthalate, diisopropyl phthalate, diisobutyl phthalate, (sec-butyl) phthalate, dicyclohexyl phthalate, diisoheptyl phthalate, di(2-ethylhexyl) phthalate, diisononyl phthalate, di(3,5,5-trimethylhexyl) phthalate, di(2,6-dimethyl-4-heptyl) phthalate, diisodecyl phthalate, diisoundecyl phthalate, didodecyl phthalate, diisotridecyl phthalate, diisotetradecyl phthalate, diisopentadecyl phthalate, diisohexadecyl phthalate, diisoheptadecyl phthalate, and diisooctadecyl phthalate. Especially preferred are di(n-propyl) phthalate, di(n-butyl) phthalate, di(n-pentyl) phthalate, di(n-hexyl) phthalate, di(n-heptyl) phthalate, di(n-octyl) phthalate, di(n-nonyl) phthalate, di(n-decyl) phthalate, di(n-undecyl) phthalate, diisopropyl phthalate, diisobutyl phthalate, (sec-butyl) phthalate, dicyclohexyl phthalate, diisoheptyl phthalate, di(2-ethylhexyl) phthalate, diisononyl phthalate, di(3,5,5-trimethylhexyl) phthalate, di(2,6-dimethyl-4-heptyl) phthalate, diisodecyl phthalate, and diisoundecyl phthalate.

(b2-4) Examples of alicyclic dicarboxylic acid esters include those represented by the formula (4)

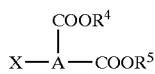

(4)

wherein A is a cyclohexane ring or cyclohexene ring; X is hydrogen or methyl; and $R^4$ and $R^5$ are the same or different and each represents a $C_3$ to $C_{22}$ straight- or branched-chain saturated or unsaturated aliphatic monovalent hydrocarbon group, which may be obtained, for example, by esterification of a corresponding aliphatic dicarboxylic acid and a $C_3$ to $C_{22}$ straight- or branched-chain saturated or unsaturated aliphatic monohydric alcohol.

Examples of the aforementioned alicyclic dicarboxylic acid include 1,2-cyclohexanedicarboxylic acid, 4-cyclohexene-1,2-dicarboxylic acid, 1-cyclohexene-1,2-dicarboxylic acid, 1,3-cyclohexanedicarboxylic acid, 1,4-cyclohexanedicarboxylic acid, 3-methyl-1,2-cyclohexanedicarboxylic acid, 4-methyl-1,2-cyclohexanedicarboxylic acid, 3-methyl-4-cyclohexene-1,2-dicarboxylic acid and/or 4-methyl-4-cyclohexene-1,2-dicarboxylic acid and anhydrides of these.

Examples of particularly desirable alicyclic dicarboxylic acid esters include esters of the formula (4) in which $R^4$ and $R^5$ are the same and each represents a $C_3$ to $C_{11}$ straight- or branched-chain alkyl. Specific examples thereof include di(n-propyl) 1,2-cyclohexanedicarboxylate, di(n-butyl) 1,2-cyclohexanedicarboxylate, di(n-pentyl) 1,2-cyclohexanedicarboxylate, di(n-hexyl) 1,2-cyclohexanedicarboxylate, di(n-heptyl) 1,2-cyclohexanedicarboxylate, di(n-octyl) 1,2-cyclohexanedicarboxylate, di(n-nonyl) 1,2-cyclohexanedicarboxylate, di(n-decyl) 1,2-cyclohexanedicarboxylate, di(n-undecyl) 1,2-cyclohexanedicarboxylate, diisopropyl 1,2-cyclohexanedicarboxylate, diisobutyl 1,2-cyclohexanedicarboxylate, di(sec-butyl) 1,2-cyclohexanedicarboxylate, dicyclohexyl 1,2-cyclohexanedicarboxylate, diisoheptyl 1,2-cyclohexanedicarboxylate, di(2-ethylhexyl) 1,2-cyclohexanedicarboxylate, diisononyl 1,2-cyclohexanedicarboxylate, di(3,5,5-trimethylhexyl) 1,2-cyclohexanedicarboxylate, di(2,6-dimethyl-4-heptyl) 1,2-cyclohexanedicarboxylate, diisodecyl 1,2-cyclohexanedicarboxylate, diisoundecyl 1,2-cyclohexanedicarboxylate, di(n-propyl) 4-cyclohexene-1,2-dicarboxylate, di(n-butyl) 4-cyclohexene-1,2-dicarboxylate, di(n-pentyl) 4-cyclohexene-1,2-dicarboxylate, di(n-hexyl) 4-cyclohexene-1,2-dicarboxylate, di(n-heptyl) 4-cyclohexene-1,2-dicarboxylate, di(n-octyl) 4-cyclohexene-1,2-dicarboxylate, di(n-nonyl) 4-cyclohexene-1,2-dicarboxylate, di(n-decyl) 4-cyclohexene-1,2-dicarboxylate, di(n-undecyl) 4-cyclohexene-1,2-dicarboxylate, diisopropyl 4-cyclohexene-1,2-dicarboxylate, diisopropyl 4-cyclohexene-1,2-dicarboxylate, diisobutyl 4-cyclohexene-1,2-dicarboxylate, di(sec-butyl) 4-cyclohexene-1,2-dicarboxylate, dicyclohexyl 4-cyclohexene-1,2-dicarboxylate, diisoheptyl 4-cyclohexene-1,2-dicarboxylate, di(2-ethylhexyl) 4-cyclohexene-1,2-dicarboxylate, diisononyl 4-cyclohexene-1,2-dicarboxylate, di(3,5,5-trimethylhexyl) 4-cyclohexene-1,2-dicarboxylate, di(2,6-dimethyl-4-heptyl) 4-cyclohexene-1,2-dicarboxylate, diisodecyl 4-cyclohexene-1,2-dicarboxylate, diisoundecyl 4-cyclohexene-1,2-dicarboxylate and the like.

On the other hand, the alicyclic dicarboxylic acid esters include those having $R^4$ and $R^5$ which are different from each other, such as esters of the formula (4) in which $R^4$ and $R^5$ are different and represent $C_3$ to $C_{11}$ straight- or branched-chain alkyl. Specific examples thereof include (isopropyl) (2-ethylhexyl) 1,2-cyclohexanedicarboxylate, (isopropyl) (isononyl) 1,2-cyclohexanedicarboxylate, (isopropyl) (3,5,5-trimethylhexyl) 1,2-cyclohexanedicarboxylate, (isobutyl) (2-ethylhexyl) 1,2-cyclohexanedicarboxylate, (isobutyl) (isononyl) 1,2-cyclohexanedicarboxylate, (isobutyl) (3,5,5-trimethylhexyl) 1,2-cyclohexanedicarboxylate, (isopropyl) (2-ethylhexyl)

4-cyclohexene-1,2-dicarboxylate, (isopropyl) (isononyl) 4-cyclohexene-1,2-dicarboxylate, (isopropyl) (3,5,5-trimethylhexyl) 4-cyclohexene-1,2-dicarboxylate, (isobutyl) (2-ethylhexyl) 4-cyclohexene-1,2-dicarboxylate, (isobutyl) (isononyl) 4-cyclohexene-1,2-dicarboxylate, and (isobutyl) (3,5,5-trimethylhexyl) 4-cyclohexene-1,2-dicarboxylate.

More desirable examples of alicyclic dicarboxylic acid esters are alicyclic dicarboxylic acid esters of the formula (4) in which —COOR$^4$ and —COOR$^5$ are present on the adjacent carbons of the cyclohexane ring or cyclohexene ring, R$^4$ and R$^5$ are each independently a C$_3$ to C$_9$ straight- or branched-chain alkyl, and X is hydrogen. Examples thereof include di(n-propyl) 1,2-cyclohexanedicarboxylate, di(n-butyl) 1,2-cyclohexanedicarboxylate, di(n-pentyl) 1,2-cyclohexanedicarboxylate, di(n-hexyl) 1,2-cyclohexanedicarboxylate, di(n-heptyl) 1,2-cyclohexanedicarboxylate, di(n-octyl) 1,2-cyclohexanedicarboxylate, di(n-nonyl) 1,2-cyclohexanedicarboxylate, diisopropyl 1,2-cyclohexanedicarboxylate, diisobutyl 1,2-cyclohexanedicarboxylate, di(sec-butyl) 1,2-cyclohexanedicarboxylate, dicyclohexyl 1,2-cyclohexanedicarboxylate, diisoheptyl 1,2-cyclohexanedicarboxylate, di(2-ethylhexyl) 1,2-cyclohexanedicarboxylate, diisononyl 1,2-cyclohexanedicarboxylate, di(3,5,5-trimethylhexyl) 1,2-cyclohexanedicarboxylate, di(2,6-dimethyl-4-heptyl) 1,2-cyclohexanedicarboxylate, di(n-propyl) 4-cyclohexene-1,2-dicarboxylate, di(n-butyl) 4-cyclohexene-1,2-dicarboxylate, di(n-pentyl) 4-cyclohexene-1,2-dicarboxylate, di(n-hexyl) 4-cyclohexene-1,2-dicarboxylate, di(n-heptyl) 4-cyclohexene-1,2-dicarboxylate, di(n-octyl) 4-cyclohexene-1,2-dicarboxylate, di(n-nonyl) 4-cyclohexene-1,2-dicarboxylate, diisopropyl 4-cyclohexene-1,2-dicarboxylate, diisobutyl 4-cyclohexene-1,2-dicarboxylate, di(sec-butyl) 4-cyclohexene-1,2-dicarboxylate, dicyclohexyl 4-cyclohexene-1,2-dicarboxylate, diisoheptyl 4-cyclohexene-1,2-dicarboxylate, di(2-ethylhexyl) 4-cyclohexene-1,2-dicarboxylate, diisononyl 4-cyclohexene-1,2-dicarboxylate, di(3,5,5-trimethylhexyl) 4-cyclohexene-1,2-dicarboxylate, di(2,6-dimethyl-4-heptyl) 4-cyclohexene-1,2-dicarboxylate, (isobutyl) (2-ethylhexyl) 1,2-cyclohexanedicarboxylate, (isobutyl) (isononyl) 1,2-cyclohexanedicarboxylate, (isobutyl) (3,5,5-trimethylhexyl) 1,2-cyclohexanedicarboxylate, (isobutyl) (2-ethylhexyl) 4-cyclohexene-1,2-dicarboxylate, (isobutyl) (isononyl) 4-cyclohexene-1,2-dicarboxylate, and (isobutyl) (3,5,5-trimethylhexyl) 4-cyclohexene-1,2-dicarboxylate.

The alicyclic dicarboxylic acid esters represented by the formula (4) include isomers (cis and trans) with respect to the ester groups, and both isomers can be used as a lubricating oil for refrigerators.

(b2-5) Examples of fatty acid polyol esters include full esters of a C$_2$ to C$_{10}$ aliphatic polyhydric alcohol having 2 to 6 hydroxyl groups, and preferably C$_5$ to C$_{10}$ aliphatic polyhydric alcohols having 2 to 6 hydroxyl groups, such as neopentyl glycol, trimethylol propane, pentaerythritol, ditrimethylolpropane, dipentaerythritol, or a similar neopentyl polyol, and a C$_3$ to C$_{22}$ straight- or branched-chain saturated fatty acid.

Specific examples of C$_3$ to C$_{22}$ straight- or branched-chain saturated fatty acids serving as a constituent of such polyol esters include propionic acid, n-butanoic acid, isobutanoic acid, n-pentanoic acid, isopentanoic acid, n-hexanoic acid, n-heptanoic acid, isoheptanoic acid, n-octanoic acid, 2-ethylhexanoic acid, 3,5,5-trimethylhexanoic acid, n-nonanoic acid, n-decanoic acid, and n-undecanoic acid. Such monovalent fatty acids may be used alone or in mixtures of two or more.

Specific examples of fatty acid polyol esters include neopentyl glycol fatty acid diesters, such as neopentyl glycol (n-butanoate), neopentyl glycol (isobutanoate), neopentyl glycol (n-pentanoate), neopentyl glycol (isopentanoate), neopentyl glycol (n-pentanoate), neopentyl glycol (isoheptanoate), neopentyl glycol (n-octanoate), neopentyl glycol (2-ethylhexanoate), neopentyl glycol (3,5,5-trimethylhexanoate), neopentyl glycol (n-nonanoate), neopentyl glycol (n-butanoate/2-ethylhexanoate) mixed ester, neopentyl glycol (isobutanoate/2-ethylhexanoate) mixed ester, neopentyl glycol (n-pentanoate/2-ethylhexanoate) mixed ester, neopentyl glycol (isopentanoate/2-ethylhexanoate) mixed ester, neopentyl glycol (n-heptanoate/2-ethylhexanoate) mixed ester, neopentyl glycol (isoheptanoate/2-ethylhexanoate) mixed ester, neopentyl glycol (n-octanoate/2-ethylhxanoate) mixed ester, neopentyl glycol (2-ethylhexanoate/3,5,5-trimethylhexanoate) mixed ester, and neopentyl glycol (2-ethylhexanoate/n-nonanoate) mixed ester. Examples of trimethylol propane fatty acid triesters include trimethylol propane (n-butanoate), trimethylol propane (isobutanoate), trimethylol propane (n-pentanoate), trimethylol propane (isopentanoate), trimethylol propane (n-heptanoate), trimethylol propane (isoheptanoate), trimethylol propane (n-octanoate), trimethylol propane (2-ethylhexanoate), trimethylol propane (3,5,5-trimethylhexanoate), trimethylol propane (n-nonanoate), trimethylol propane (n-butanoate/2-ethylhexanoate) mixed esters, trimethylol propane (isobutanoate/2-ethylhexanoate) mixed esters, trimethylol propane (n-pentanoate/2-ethylhexanoate) mixed esters, trimethylol propane (isopentanoate/2-ethylhexanoate) mixed esters, trimethylol propane (n-heptanoate/2-ethylhexanoate) mixed esters, trimethylol propane (isoheptanoate/2-ethylhexanoate) mixed esters, trimethylol propane (n-octanoate/2-ethylhexanoate) mixed esters, trimethylol propane (2-ethylhexanoate/3,5,5-trimethylhexnoate) mixed esters, and trimethylol propane (2-ethylhexanoate/n-nonanoate) mixed esters. Examples of pentaerythritol fatty acid pentaesters include pentaerythritol (n-butanoate), pentaerythritol (isobutanoate), pentaerythritol (n-pentanoate), pentaerythritol (isopentanoate), pentaerythritol (n-heptanoate), pentaerythritol (isoheptanoate), pentaerythritol (n-octanoate), pentaerythritol (2-ethylhexanoate), pentaerythritol (3,5,5-trimethylhexanoate), pentaerythritol (n-nonanoate), pentaerythritol (n-butanoate/2-ethylhexanoate) mixed esters, pentaerythritol (isobutanoate/2-ethylhexanoate) mixed esters, pentaerythritol (n-pentonate/2-ethylhexanoate) mixed esters, pentaerythritol (isopentonate/2-ethylhexanoate) mixed esters, pentaerythritol (n-heptanoate/2-ethylhexaonate) mixed esters, pentaerythritol (isoheptanoate/2-ethylhexanoate) mixed esters, pentaerythritol (n-octanoate/2-ethylhexanoate) mixed esters, pentaerythritol (2-ethylhexanoate/3,5,5-triemthylhexnoate) mixed esters, and pentaerythritol (2-ethylhexanoate/n-nonanoate) mixed esters.

Among them, branched fatty acid esters are preferred. Specific examples include neopentyl glycol (isobutanoate), neopentyl glycol (isopentanoate), neopentyl glycol (isoheptanoate), neopentyl glycol (2-ethylhexanoate), neopentyl glycol (3,5,5-trimethylhexanoate), neopentyl glycol (isobutanoate/2-ethylhexanoate) mixed ester, neopentyl glycol (isopentanoate/2-ethylhexanoate) mixed ester, neopentyl glycol (isoheptanoate/2-ethylhexanoate) mixed ester, neopentyl glycol (2-ethylhexanoate/3,5,5-trimethylhexanoate)

mixed ester, trimethylol propane (isobutanoate), trimethylol propane (isopentanoate), trimethylol propane (isoheptanoate), trimethylol propane (2-ethylhexanoate), trimethylol propane (3,5,5-trimethylhexanoate), trimethylol propane (isobutanoate/2-ethylhexanoate) mixed esters, trimethylol propane (isopentanoate/2-ethylhexanoate) mixed esters, trimethylol propane (isoheptanoate/2-ethylhexanoate) mixed esters, trimethylol propane (2-ethylhexanoate/3,5,5-trimethylhexnoate) mixed esters, pentaerythritol (isobutanoate), pentaerythritol (isopentanoate), pentaerythritol (isoheptanoate), pentaerythritol (2-ethylhexanoate), pentaerythritol (3,5,5-trimethylhexanoate), pentaerythritol (isobutanoate/2-ethylhexanoate) mixed esters, pentaerythritol (isopentonate/2-ethylhexanoate) mixed esters, pentaerythritol (isoheptanoate/2-ethylhexanoate) mixed esters, and pentaerythritol (2-ethylhexanoate/3,5,5-triemthylhexnoate) mixed esters.

(b2-6) Examples of other esters include carboxylic acid esters such as esters of dimer acid or a hydrogenate thereof (saturated acids) and $C_3$ to $C_{22}$ straight- or a branched-chain saturated or unsaturated aliphatic alcohol.

(b3) Polyalkylene Glycols

Examples of polyalkylene glycols include a ring-opening polymerization product (adduct) of $C_1$ to $C_{18}$ alcohol and $C_2$ to $C_4$ straight- or branched-chain alkylene oxide. Examples of alkylene oxides include ethylene oxide, propylene oxide, and butylene oxide. Polymers (adducts) obtained by using one of these, or copolymers (co-adducts) obtained by using a mixture of two or more can be used. Also usable are those wherein hydroxyl group or groups at one or both ends has/have been etherified or esterified. The kinematic viscosity of the polymer should be 5.0 to 1000 mm$^2$/s (40° C.), and preferably 5.0 to 500 mm$^2$/s (40° C.)

(b4) Polyvinyl Ethers

Examples of polyvinyl ethers include compounds obtained by the polymerization of vinyl ether monomers. Examples of such monomers include methyl vinyl ether, ethyl vinyl ether, isopropyl vinyl ether, n-butyl vinyl ether, isobutyl vinyl ether, sec-butyl vinyl ether, tert-butyl vinyl ether, n-pentyl vinyl ether, n-hexyl vinyl ether, 2-methoxyethyl vinyl ether, and 2-ethoxyethyl vinyl ether. Polymers obtained by using one of these, or copolymers obtained by using two or more can be used. The kinematic viscosity should be 5.0 to 1000 mm$^2$/s (40° C.), and preferably 5.0 to 800 mm$^2$/s (40° C.).

(b5) Polyphenyl Ethers

Examples of polyphenyl ethers include compounds with a structure in which two or more aromatic rings are linked by ether bonds or thioether bonds at the meta positions. Specific examples include bis(m-phenoxyphenyl) ether, m-bis(m-phenoxyphenoxy)benzene, and the corresponding thioethers (so-called C-ethers) wherein one or more oxygen atoms has/have been replaced by one or more sulfur atoms.

(b6) Alkyl Phenyl Ethers

Examples of alkyl phenyl ether include compounds in which polyphenyl ethers are substituted with one or more $C_6$ to $C_{18}$ straight- or branched-chain alkyls, particularly alkyl diphenyl ethers substituted with one or more alkyl groups.

(b7) Silicone Oils

Examples of silicone oils include dimethyl silicone and methyl phenyl silicone, as well as long-chain alkyl silicone, fluorosilicone and similar modified silicones.

Preferred Combination Base Oils

Among the aforementioned combination base oils, the following are recommended for their hydrolytic stability and practical use: (i) fatty acid polyol esters (b2-5), (ii) phthalic acid esters (b2-3), (iii) alicyclic dicarboxylic acid esters (b2-4), (iv) polyvinyl ethers (b4), (v) hydrocarbon oils (b1), and (vi) polyalkylene glycol (b3). Particularly recommended are (i) fatty acid polyol esters (b2-5), (iii) alicyclic dicarboxylic acid esters (b2-4), and (iv) polyvinyl ethers (b4).

The aforementioned combination base oils have a high viscosity on their own and are sometimes not usable for refrigerator oils, depending on the type of refrigerator. However, the use thereof in combination with the aliphatic saturated branched-chain carboxylic acid monoalkyl ester of the formula (1) of the present invention allows the viscosity of the refrigerator oil to be readily adjusted in order to provide refrigerator oils of varying viscosity.

When a combination of the present ester and the aforementioned combination base oil is used as the refrigerator oil, it is preferable that the refrigerator oil that is obtained has a kinematic viscosity (at 40° C.) of 4.0 to 36 mm$^2$/s.

Also it is recommended that the lubricating oil for refrigerators containing the present ester has a water content not greater than 100 ppm, and preferably not greater than 50 ppm. When the water content is not greater than 100 ppm, the lubricating oil is excellent in hydrolytic stability, electrical insulating properties, and thermal stability.

Additives

The lubricating oil for refrigerators according to the present invention can contain at least one additive as needed to improve the base oil performance, such as antioxidants, metal deactivators, antiwear agents, defoaming agents, and hydrolysis depressants. Such additives are not limited, provided that the intended effects are achieved. The following are specific examples.

Examples of antioxidants include 2,6-di-tert-butyl-p-cresol, 4,4'-methylenebis-2,6-di-tert-butylphenol or other such phenol-based compounds, N-phenyl-α-naphthylamine, p,p'-dioctyldiphenylamine or other such amine-based compounds, and phenothiazine or other such sulfur-based compounds. When any antioxidants are used, they may be added, for example, in an amount of 0.01 to 5 wt %, and preferably 0.1 to 2 wt %, relative to the refrigerator oil.

Examples of metal deactivators which can be used include benzotriazole-based and thiadiazole-based compounds. When any such metal deactivators are used, they can be added, for example, in an amount of 0.01 to 0.4 wt % relative to the refrigerator oil.

Examples of antiwear agents generally include tricresyl phosphate, cresyl diphenyl phosphate, alkyl phenyl phosphate, tributyl phosphate, dibutyl phosphate and other such phosphate esters, tributyl phosphite, dibutyl phosphite, triisopropyl phosphite and other such phosphite esters, as well as amine salts thereof. When any such antiwear agents are used, it is recommended that the amount thereof is 0.01 to 5 wt %, preferably 0.01 to 2 wt %, relative to the refrigerator oil.

Liquid silicones are suitable defoaming agents. When used, they may be added in an amount of 0.0005 to 0.01 wt % relative to the base oil.

In order to further improve thermal and hydrolytic stabilities, the refrigerator oil composition of the present invention can also include at least one epoxy compound selected from the group consisting of:

(1) phenyl glycidyl ether-based epoxy compounds;

(2) alkyl glycidyl ether-based epoxy compounds;

(3) glycidyl ester-based epoxy compounds;

(4) allyloxirane compounds;

(5) alkyloxirane compound;
(6) alicyclic epoxy compounds;
(7) epoxidized fatty acid monoesters; and
(8) epoxidized vegetable oils.

(1) Specific examples of phenyl glycidyl ether-based epoxy compounds include phenyl glycidyl ethers and alkyl phenyl glycidyl ethers. Herein, the alkyl phenyl glycidyl ethers include those with 1 to 3 $C_1$ to $C_{13}$ alkyl groups, and preferably those with one $C_4$ to $C_{10}$ alkyl group, such as n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, and decylphenyl glycidyl ether.

(2) Specific examples of alkyl glycidyl ether-based epoxy compounds include decyl glycidyl ether, undecyl glycidyl ether, dodecyl glycidyl ether, tridecyl glycidyl ether, tetradecyl glycidyl ether, 2-ethylhexyl glycidyl ether, neopentyl glycol diglycidyl ether, trimethylol propane triglycidyl ether, pentaerythritol tetraglycidyl ether, 1,6-hexandediol diglycidyl ether, sorbitol polyglycidyl ether, polyalkylene glycol monoglycidyl ether, polyalkylene glycol diglycidyl ether, and the like.

(3) Specific examples of glycidyl ester-based epoxy compounds are those represented by the formula (5) below:

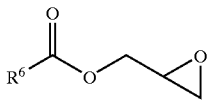

(5)

wherein $R^6$ is a $C_1$ to $C_{18}$ hydrocarbon group.

In the aforementioned formula, $R^6$ is a $C_1$ to $C_{18}$ hydrocarbon group. Examples of such hydrocarbon groups include $C_1$ to $C_{18}$ alkyls, $C_2$ to $C_{18}$ alkenyls, $C_5$ to $C_7$ cycloalkyls, $C_6$ to $C_{18}$ alkylcycloalkyls, $C_6$ to $C_{10}$ aryls, $C_7$ to $C_{18}$ alkylaryls, and $C_7$ to $C_{18}$ arylalkyls. Of these, $C_5$ to $C_{15}$ alkyls, $C_2$ to $C_{15}$ alkenyls, phenyl, and alkylphenyls with $C_1$ to $C_4$ alkyls are preferred.

Specific preferred examples among the glycidyl ester-based epoxy compounds include glycidyl 2,2-dimethyloctanoate, glycidyl benzoate, glycidyl tert-butyl benzoate, glycidyl arylate, and glycidyl methacrylate.

(4) Specific examples of allyloxirane compounds include 1,2-epoxystyrene and alkyl-1,2-epoxystyrene.

(5) Specific examples of alkyloxirane compounds include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,1,2-epoxyoctadecane, 2-epoxynonadecane, and 1,2-epoxyicosane.

(6) Examples of alicyclic epoxy compounds include compounds in which the alicyclic ring is formed directly by the carbon atoms forming the epoxy groups, such as compounds represented by the formula (6) below.

(6)

Examples of alicyclic epoxy compounds include epoxy compounds having $C_3$ to $C_{10}$ alicyclic alkyl. Specific examples include 1,2-epoxycyclohexane, 1,2-epoxycyclopentane, 3,4-epoxycyclohexylmethyl-3,4-epoxycyclohexanecarboxylate, bis(3,4-epoxycyclohexylmethyl) adipate, exo-2,3-epoxynorbornane, bis(3,4-epoxy-6-methylcyclohexylmethyl) adipate, 2-(7-oxabicyclo[4.1.0]hept-3-yl)-spiro(1,3-dioxane-5,3'-[7]oxabicyclo[4.1.0]heptane, 4-(1'-methylepoxyethyl)-1,2-epoxy-2-methylcyclohexane, and 4-epoxyethyl-1,2-epoxycyclohexane.

(7) Specific examples of the epoxidized fatty acid monoesters include esters of an epoxidized $C_{12}$ to $C_{20}$ fatty acid and a $C_1$ to $C_8$ alcohol, phenol or an alkylphenol. Particularly desirable examples include butyl, hexyl, benzyl, cyclohexyl, methoxyethyl, octyl, phenyl and butylphenyl esters of epoxystearic acid.

(8) Specific examples of epoxidized vegetable oils include epoxy compounds of soybean oil, linseed oil, and cottonseed oil.

Of these epoxy compounds, preferred for improving thermal and hydrolytic stability include the phenyl glycidyl ether-based epoxy compounds, the glycidyl ester-based epoxy compounds, the alicyclic epoxy compounds, and the epoxidized fatty acid monoesters. The glycidyl ester-based epoxy compounds and the alicyclic epoxy compounds are especially preferred.

When such epoxy compounds are blended with the refrigerator oil composition of the present invention, the amount is not particularly limited, but it is usually desirable that the epoxy compound is blended in such an amount that the content thereof will be 0.1 to 5.0 mass %, more preferably 0.2 to 2.0 mass %, based on the total amount of the refrigerator oil composition (relative to the total amount of the base oil and all the additives added).

The aforementioned phosphorus compounds and epoxy compounds can, of course, be used in combinations of two or more.

Method for Producing Lubricating Oil for Refrigerators According to the Present Invention The lubricating oil for refrigerators according to the present invention can be produced using the esters represented by the formula (1) above on their own or by mixing such esters with the aforementioned combination base oils, and if desired, uniformly mixing the aforementioned additives.

The process for producing the aforementioned lubricating oil for refrigerators may include dehydration treatment of the lubricating oil. Such a dehydration treatment may be performed at any point before or after the combination base oil is mixed, or at any point before or after the additives are dissolved. Dehydration can be carried out, for example, by treating the lubricating oil for 0.1 to 10 hours at ordinary or reduced pressure, preferably at a reduced pressure of 0.13 MPa to 66.6 MPa, at a temperature ranging from room temperature to 150° C.

The lubricating oils for refrigerators having a water content of not more than 100 ppm, preferably not more than 50 ppm, are preferred, because they are excellent in hydrolytic stability, electrical insulating properties, and thermal stability.

Refrigerators in Which the Lubricating Oil for Refrigerators According to the Present Invention is Used The lubricating oil for refrigerators according to the present invention can, be used as lubricating oil for refrigerators using various types of refrigerants. Examples of such refrigerants of these refrigerators include hydrocarbon refrigerants, halogen-containing hydrocarbon refrigerants, perfluoroethers and similar fluoroether refrigerants, dimethyl ether and similar fluorine-free ether refrigerants, carbon dioxide, ammonia, or the like, as well as mixtures thereof.

Preferred examples of hydrocarbon refrigerants are those which is in the state of gas at a temperature of 25° C. and at a pressure of 1 atm. Specific examples include $C_1$ to $C_5$, and preferably $C_1$ to $C_4$, alkanes, cycloalkanes, alkenes and other such saturated or unsaturated hydrocarbons, alkyl ethers and other such ether bond-containing hydrocarbons, and mixtures thereof. More specific examples include methane, ethylene, ethane, propylene, propane, cyclopropane, butane, isobutane, cyclobutane, methylcyclopropane, or mixtures of two or more of these.

Examples of halogen-containing hydrocarbon refrigerants include hydrofluorocarbon, hydrochlorofluorocarbon and other such fluorine-containing hydrocarbon refrigerants, hydrochlorocarbons and similar fluorine-free hydrocarbon refrigerants. These refrigerants may be used either singly or in combination.

Among the above refrigerants, at least one member selected from the group consisting of hydrocarbon refrigerants and halogen-containing hydrocarbons is preferred. For protecting the ozone layer, hydrocarbon refrigerants or hydrofluorocarbon refrigerants are recommended, among which $C_1$ to $C_3$, particularly $C_1$ to $C_2$, hydrofluorocarbon refrigerants are most preferred.

Examples of hydrofluorocarbon refrigerants include $C_1$ to $C_3$, preferably $C_1$ to $C_2$, hydrofluorocarbons. Specific examples include difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluorethane (HFC-143a), 1,1-difluoroethane (HFC-152a) and other such HFC refrigerants, or mixtures of two or more of these. Such refrigerants may be selected as desired according to the intended application or required performance. Preferred examples include HFC-32 alone; HFC-23 alone; HFC-134a alone; HFC-125 alone; HFC-134a/HFC-32=60 to 80 mass %/40 to 20 mass % mixtures; HFC-32/HFC-125=40 to 70 mass %/60 to 30 mass % mixtures; HFC-125/HFC-143a=40 to 60 mass %/60 to 40 mass % mixtures; HFC-134a/HFC-32/HFC-125=60 mass %/30 mass %/10 mass % mixture; HFC-134a/HFC-32/HFC-125=40 to 70 mass %/15 to 35 mass %/5 to 40 mass % mixtures; and HFC-125/HFC-134a/HFC-143a=35 to 55 mass %/1 to 15 mass %/40 to 60 mass % mixtures. More specifically, there is mentioned HFC-134a/HFC-32=70/30 mass % mixture; HFC-32/HFC-125=60/40 mass % mixture; HFC-32/HFC-125=50/50 mass % mixture (R410A); HFC-32/HFC-125=45/55 mass % mixture (R410B); HFC-125/HFC-143a=50/50 mass % mixture (R507C); HFC-32/HFC-125/HFC-134a=30/10/60 mass % mixture; HFC-32/HFC-125/HFC-134a=23/25/52 mass % mixture (R407C); HFC-32/HFC-125/HFC-134a=25/15/60 mass % mixture (R407E); and HFC-125/HFC-134a/HFC-143a=44/4/52 mass % mixture (R404A).

HFC-134a, R404A, R407C, R407E and R410A are particularly recommended.

Examples of refrigerators in which the refrigerator oil of the present invention is usable include automotive air conditioners, room air conditioners, air conditioners for packages, dehumidifiers, refrigerator freezers, automatic vending machines, refrigerated display cases, warehouse refrigerators, and cooling units in chemical plants. Particularly preferred are refrigerators using at least one member selected from the group consisting of the aforementioned hydrocarbon refrigerants and halogen-containing hydrocarbon refrigerants. More preferably, refrigerators using the aforementioned hydrofluorocarbon refrigerants are recommended.

Working Fluid Composition for Refrigerators

The present invention is also intended to provide a working fluid composition for refrigerators comprising the lubricating oil for refrigerators according to the present invention and a refrigerant as described above.

That is, researches by the inventors revealed that the lubricating oil for refrigerators according to the present invention, particularly the ester represented by the formula (1), has good miscibility with refrigerants, such as the aforementioned hydrocarbon refrigerants, halogen-containing hydrocarbon refrigerants, perfluoroether and other fluoroether refrigerants, dimethyl ether and other such fluorine-free ether refrigerants, carbon dioxide, ammonia, and similar refrigerants, especially at least one such refrigerant selected from the group consisting of the aforementioned hydrocarbon and halogen-containing hydrocarbon refrigerants (especially hydrofluorocarbon refrigerants).

It was thus discovered that a mixture of (I) the lubricating oil for refrigerators according to the present invention and (II) a refrigerant, such as the aforementioned hydrocarbon refrigerant, halogen-containing hydrocarbon refrigerant, perfluoroether and other fluoroether refrigerant, dimethyl ether and other such fluorine-free ether refrigerant, carbon dioxide, ammonia, and similar refrigerant, especially at least one refrigerant selected from the group consisting of the aforementioned hydrocarbon and halogen-containing hydrocarbon refrigerants (especially hydrofluorocarbon refrigerants) function as a working fluid for refrigerators.

That is, the present invention provides a working fluid composition comprising:

(I) an aliphatic saturated branched-chain carboxylic acid monoalkyl ester represented by the formula (1), and (II) a refrigerant, such as the aforementioned hydrocarbon refrigerant, halogen-containing hydrocarbon refrigerant, perfluoroether and other fluoroether refrigerant, dimethyl ether and other such fluorine-free ether refrigerant, carbon dioxide, ammonia, and similar refrigerant; particularly at least one refrigerant selected from the group consisting of the aforementioned hydrocarbon and halogen-containing hydrocarbon refrigerants (especially hydrofluorocarbon refrigerants).

The ratio of the aforementioned component (I) to component (II) is generally (I):(II)=1:99 to 85:15, preferably 2:98 to 80:20, by weight.

The present invention also provides a working fluid composition comprising:

(I) (a) at least one aliphatic saturated branched-chain carboxylic acid monoalkyl ester represented by the formula (1), and (b) at least one member selected from the group consisting of (i) the fatty acid polyol esters, (ii) the phthalic acid esters, (iii) the alicyclic dicarboxylic acid esters, (iv) the polyvinyl ethers, (v) the hydrocarbon oils and (vi) the polyalkylene glycols, and (II) a refrigerant, such as the aforementioned hydrocarbon refrigerant, halogen-containing hydrocarbon refrigerant, perfluoroether and other fluoroether refrigerant, dimethyl ether and other such fluorine-free ether refrigerant, carbon dioxide, ammonia, and similar refrigerant, particularly at least one refrigerant selected from the group consisting of the aforementioned hydrocarbon and halogen-containing hydrocarbon refrigerants (especially hydrofluorocarbon refrigerants).

The ratio of components (a) to (b) in component (I) above is, for example, (a):(b)=0.5:99.5 to 99.5:0.5, preferably (a):(b)=5:95 to 95:5, more preferably (a):(b)=15:85 to 85:15, by weight. The ratio of component (I) to component (II) is generally (I):(II)=1:99 to 85:15, preferably 2:98 to 80:20, by weight.

When such a mixture is used as working fluid, an advantage is that the lubricating oil of the present invention will be miscible over a wide temperature range, from low to elevated temperatures, with refrigerants such as the aforementioned hydrocarbon refrigerants, halogen-containing hydrocarbon refrigerants, perfluoroether and other fluoroether refrigerants, dimethyl ether and other such fluorine-free ether refrigerants, carbon dioxide, ammonia, and similar refrigerants, particularly at least one refrigerant selected from the group consisting of the aforementioned hydrocarbon and halogen-containing hydrocarbon refrigerants (especially hydrofluorocarbon refrigerants). The working fluid is less likely to cause phase separation.

Method for Lubricating Refrigerators

The lubricating oil of the present invention can be used to lubricate the aforementioned types of refrigerators. FIG. 1 is a schematic diagram of such a refrigerator.

The refrigerator is composed primarily of a compressor 1, condenser 2, expansion valve 3, evaporator 4, and tubing 5 connecting the various components. A dryer (not shown) may also be included as needed.

The method for lubricating refrigerators is described below with reference to a refrigerator using a hydrofluorocarbon refrigerant, but the method for lubricating refrigerators using other refrigerants is basically the same.

A working fluid composition comprising the lubricating oil of the present invention and a hydrofluorocarbon refrigerant is introduced into the compressor 1 of the refrigerator. At this point, the working fluid composition may be used in an amount effective for operating the refrigerator. In general, the amount may be determined in accordance with the performance required of the refrigerator, the intended application, and so forth. The amount of the working fluid composition can be suitably selected in accordance with the knowledge of those having ordinary skill in the art.

The refrigerant is primarily compressed by the compressor 1 and is passed through the tubing 5, and the compressed refrigerant is liquefied by the condenser 2, and is guided through the expansion valve 3 to the evaporator 4, where the refrigerant is vaporized to effect heat exchange through the evaporator 4. At this point, most of the refrigerator oil remains in the compressor 1, but the hydrofluorocarbon refrigerant is present as dissolved in the refrigerator oil. During this refrigerator cycle, a small amount of the refrigerator oil circulates in the device along with the refrigerant.

The compressor 1 illustrated here is a compressor with an open, semi-open, or hermetic compressor, depending on the method by which the compression parts and the motor driving them are assembled. Due to differences in the compression method, there are refrigerators with reciprocal, rotary, scroll or screw compressors, as well as refrigerators with centrifugal compressors, but any of them can be used.

The lubricating oil of the present invention results in better operation of the compressor 1 because of good miscibility between the lubricating oil of the present invention and the hydrofluorocarbon in the compressor 1. Since the working fluid composition is less likely to cause phase separation, the lubricating oil is less likely to localize in areas other than the compressor 1. Furthermore, the lubricating oil of the present invention has good hydrolytic stability and causes a small increase in the total acid number, so that less corrosion is encountered in the compressor 1, condenser 2, expansion valve 3, evaporator 4, or tubing 5 connecting such parts. At the same time, the lubricating oil of the present invention has low viscosity, leading to less energy loss as a result of friction during the operation of the refrigerator. The working fluid composition also has excellent insulating properties, and thus serves as an insulating oil to prevent leakage in the compressor motors of refrigerators having hermetic or semi-hermetic compressors, making the oil of the invention especially desirable for use in refrigerators with hermetic compressors.

Examples of compressor 1 include (1) high pressure container compressors, in which a hermetic container holding the refrigerator oil houses a motor comprising a rotor and stator, a rotating shaft fixed to the rotor, and a compressor device connected to the motor via the rotating shaft and a high pressure refrigerant gas discharged from the compressor device is held in the hermetic container; and (2) low pressure container compressors, in which a hermetic container holding the refrigerator oil houses a motor comprising a rotor and stator, a rotating shaft fixed to the rotor, and a compressor device connected to the motor via the rotating shaft and a high pressure refrigerant gas discharged from the compressor device is directly discharged out of the hermetic container.

As an insulating film serving as a material in the electrical insulation system of the motor, preferably usable are crystalline plastic films with a glass transition point of 50° C. or higher, specifically an insulating film made of at least one member selected from the group consisting of polyethylene terephthalate, polybutylene terephthalate, polyphenylene sulfide, polyether ether ketone, polyethylene naphthalate, polyamideimide and polyimide, or a composite film comprising a film with a low glass transition temperature covered by a resin layer with a higher glass transition temperature, because of lower susceptibility to loss of tensile strength or electrical insulating properties. The magnet wire used in the motor is preferably coated with an enamel having a glass transition temperature of 120° C. or higher, such as a single layer of polyester, polyester imide, polyamide or polyamideimide, or an enamel coating comprising a composite coating composed of a lower layer with a low glass transition temperature and an upper layer with a higher glass transition temperature. Examples of enamel wires coated with such composite coating include those having a polyester imide lower layer and a polyamideimide upper layer (AI/EI), and those having a polyester lower layer and a polyamideimide upper layer (AI/PE).

The dessicant to be used in the dryer is preferably a synthetic zeolite comprising a silicate and aluminate alkali metal complex salt with a pore diameter of not more than 3.3 Å and a carbon dioxide gas absorption capacity of not more than 1.0% at a carbon dioxide partial pressure of 250 mmHg at 25° C. Specific examples include XH-9, XH-10, XH-11, and XH-600, manufactured by Union Showa.

PREFERRED MODE FOR CARRYING OUT THE INVENTION

Examples of preferred embodiments of the refrigerator oil of the present invention are given below:

refrigerator oil containing (2-ethylhexyl) 2-ethylhexanoate, refrigerator oil containing (isononyl) 2-ethylhexanoate, refrigerator oil containing (3,5,5-trimethylhexyl) 2-ethylhexanoate, refrigerator oil containing (3,5,5-trimethylhexyl) 2-ethylbutanoate, refrigerator oil containing (2-ethylhexyl) 2-ethylhexanoate and (n-dodecyl) 2-ethylhexanoate, refrigerator oil containing (2-ethylhexyl) 2-ethylhexanoate and a $C_3$ to $C_{18}$ fatty acid triester of trimethylolpropane, refrigerator oil containing (2-ethylhexyl) 2-ethyhexanoate and a $C_3$ to $C_{18}$ fatty acid tetraester of pentaerythritol, refrigerator oil containing (2-ethylhexyl) 2-ethylhexanoate and a di($C_3$ to $C_{18}$ alkyl) ester of 4-cyclohexene-1,2-dicarboxylic acid, refrigerator oil containing (2-ethylhexyl) 2-ethylhexanoate and a di($C_3$ to $C_{18}$ alkyl) ester of 1,2-cyclohexanedicarboxylic acid, refrigerator oil containing (2-ethylhexyl) 2-ethylhexanoate and a di($C_3$ to $C_{18}$ alkyl) ester of phthalic acid, refrigerator oil containing (3,5,5-trimethylhexyl) 2-ethylbutanoate and a di($C_3$ to $C_{18}$ alkyl) ester of 1,2-cyclohexanedicarboxylic acid.

Examples of preferred embodiments of the working fluid composition of the present invention are given below. The proportions of the components of the working fluid composition are the same as in the section entitled "Working fluid composition for refrigerators."

working fluid compositions containing (2-ethylhexyl) 2-ethylhexanoate and HFC-134a, working fluid compositions containing (isononyl) 2-ethylhexanoate and HFC-134a, working fluid compositions containing (3,5,5-trimethylhexyl) 2-ethylhexanoate and HFC-134a, working fluid compositions containing (3,5,5-trimethylhexyl) 2-ethylbutanoate and HFC-134a, working fluid compositions containing (2-ethylhexyl) 2-ethylhexanoate, (n-dodecyl) 2-ethylhexanoate and HFC-134a, working fluid compositions containing (2-ethylhexyl) 2-ethylhexanoate, a trimethylolpropane $C_3$ to $C_{18}$ fatty acid triester and HFC-134a, working fluid compositions containing (2-ethylhexyl) 2-ethylhexanoate, a pentaerythritol $C_3$ to $C_{18}$ fatty acid tetraester and HFC-134a, working fluid compositions containing (2-ethylhexyl) 2-ethylhexanoate, a dialkyl ($C_3$ to $C_{18}$) ester of 4-cyclohexene-1,2-dicarboxylic acid and HFC-134a, working fluid compositions containing (2-ethylhexyl) 2-ethylhexanoate, a dialkyl ($C_3$ to $C_{18}$) ester of 1,2-cyclohexanedicarboxylic acid and HFC-134a, working fluid compositions containing (2-ethylhexyl) 2-ethylhexanoate, a dialkyl ($C_3$ to $C_{18}$) ester of phthalic acid and HFC-134a, working fluid compositions containing (3,5,5-trimethylhexyl) 2-ethylbutanoate, a dialkyl($C_3$ to $C_{18}$) ester of 1,2-cyclohexanedicarboxylic acid and HFC-134a, and working fluid compositions containing (3,5,5-trimethylhexyl) 2-ethylhexanoate, a dialkyl($C_3$ to $C_{18}$) ester of phthalic acid and HFC-134a,

EFFECTS OF THE INVENTION

The use of the present ester for refrigerator oil achieves the following advantages.

1) The present ester has better hydrolytic stability.
2) The present ester has better miscibility with hydrofluorocarbon refrigerants.
3) The present ester has a higher volume resistivity, and better electrical insulating properties.
4) The present ester has a far lower viscosity than conventionally used refrigerator oils, and can minimize energy loss.
5) Compositions obtained by mixing the present ester with a conventional refrigerator oil can be adjusted to a desired viscosity by adjusting the proportions thereof.
6) A lubricating oil for refrigerators comprising the aliphatic saturated branched-chain carboxylic acid monoalkyl ester of the present invention has excellent hydrolytic stability and entails less increase in the total acid number under stringent conditions, causing less change in metal surfaces.
7) The lubricating oil of the present invention is excellent in electrical insulating properties and miscibility with fluorocarbons at low temperatures, and can be used as a lubricating oil for compressors in which the refrigerant is a hydrofluorocarbon containing no chlorine atom within the molecule, and is tremendously beneficial for industrial purposes.
8) The present ester has a low viscosity and can thus be used with other lubricating oils, thereby enabling to provide refrigerator lubricating oils of varying viscosity grade.

EXAMPLES

The present invention will be described in further detail below with reference to examples and comparative examples. The properties of the lubricating oils in the examples and comparative examples were assessed in the following manner.

Total Acid Number

Measured in accordance with JIS-K-2501.

Kinematic Viscosity

Measured in accordance with JIS-K-2283 using an Ubellohde viscometer.

Water Content

Measured using a Karl Fischer's moisture meter (MKC-510, manufactured by Kyoto Denshi) in accordance with JIS-K-2275.

Volume Resistivity

Measured at 25° C. in accordance with JIS-C-2101.

Two-layer Separation Temperature

In accordance with JIS-K-2211, a sample oil was added to a hydrofluorocarbon refrigerant HFC-134a so as to adjust the proportion of the sample oil to 20 wt %, and the temperature at which the mixture separated into two phases was determined between −50 and 38° C. The lower the temperature, the better the miscibility between the sample oil and hydrofluorocarbon.

Hydrolytic Stability Test

An iron wire, a copper wire and an aluminum wire, each having a length of 4 cm, were placed in glass test tube having a length of 30 cm and an inside diameter of 6.6 mm, and 2.0 g of sample ester and 0.2 g of distilled water were placed therein. The test tubes were sealed while being degassed with an aspirator, and the test tube was heated for 20 or 40 hours at 175° C. in an oven. The sample ester was then taken out to measure the total acid number. The surfaces of the metal wires were visually inspected and evaluation was made according to the following three-grade criteria. The state of the ester after the test was also inspected.
○: no change
Δ: some discoloration
x: turned black or deep brown

Manufacturing Example 1

144 g (1 mol) of 2-ethylhexanoic acid and 143 g (1.1 mol) of 2-ethylhexanol were fed to a four-necked flask equipped with a stirrer, a thermometer and a water separator having a condenser tube, and the mixture was heated to 200° C. under reduced pressure in the presence of a tetraisopropyl titanate catalyst. Esterification reaction was carried out for about 9 hours while removing the formed water by the water separator. After the reaction, the excess 2-ethylhexanol was distilled off, and the product was neutralized with excess sodium hydroxide and then washed with water to neutrality. The product was then treated with activated carbon (0.3 wt. % relative to the starting materials fed) at 90° C., and was then filtered, giving 246 g of (2-ethylhexyl) 2-ethylhexanoate, which was then dehydrated for 5 hours at a temperature of 100° C. and a reduced pressure of 13.3 MPa. The resulting ester had a total acid number of 0.01 mgKOH/g, a water content of 11 ppm, a kinematic viscosity of 2.7 mm$^2$/s (40° C.) and 1.1 mm$^2$/s (100° C.), a volume resistivity of $3.0 \times 10^{13}$ Ω·cm, and a two-layer separation temperature of −24° C.

Manufacturing Example 2

Following the procedure of Manufacturing Example 1, (3,5,5-trimethylhexyl) 2-ethylbutanoate was obtained from 2-ethylbutanoic acid and 3,5,5-trimethylhexanol. The resulting ester had a total acid number of 0.01 mgKOH/g, a water content of 18 ppm, a kinematic viscosity of 2.6 mm$^2$/s (40° C.) and 1.1 mm$^2$/s (100° C.), a volume resistivity of $2.1 \times 10^{13}$ Ω·cm, and a two-layer separation temperature of −50° C. or below.

Manufacturing Example 3

Isononyl 2-ethylhexanoate was obtained from 2-ethylhexanoic acid and isononanol in the same manner as in Manufacturing Example 1. The resulting ester had a total acid number of 0.01 mgKOH/g, a water content of 25 ppm, a kinematic viscosity of 3.4 mm$^2$/s (40° C.) and 1.1 mm$^2$/s (100° C.), a volume resistivity of $8.0 \times 10^{13}$ Ω·cm, and a two-layer separation temperature of −8° C.

Manufacturing Example 4

(3,5,5-Trimethylhexyl) 2-ethylhexanoate was obtained from 2-ethylhexanoic acid and 3,5,5-trimethylhexanol in the same manner as in Manufacturing Example 1. The resulting ester had a total acid number of 0.01 mgKOH/g, a water content of 16 ppm, a kinematic viscosity of 3.5 mm$^2$/s (40° C.) and 1.3 mm$^2$/s (100° C.), a volume resistivity of $1.0 \times 10^{14}$ Ω·cm and a two-layer separation temperature of −31° C.

Manufacturing Example 5

An ester mixture was obtained, in the same manner as in Example 1, from 2-ethylhexanoic acid and an alcohol mixture of 2-ethylhexanol and n-dodecanol (molar ratio 82:18). The resulting ester had a total acid number of 0.01 mgKOH/g, a water content of 22 ppm, a kinematic viscosity of 3.1 mm$^2$/s (40° C.) and 1.2 mm$^2$/s (100° C.), a volume resistivity of $7.7 \times 10^{13}$ Ω·cm, and a two-layer separation temperature of −8° C.

Comparative Manufacturing Example 1

2-Ethylhexyl palmitate was prepared following the procedure of Example 1. The resulting ester had a total acid number of 0.01 mgKOH/g, a water content of 13 ppm, a kinematic viscosity of 8.1 mm$^2$/s (40° C.) and 2.7 mm$^2$/s (100° C.), and a volume resistivity of $6.2 \times 10^{13}$ Ω·cm. However, when the ester was subjected to the measurement of the two-layer separation temperature, it was found that the ester was not miscible with the fluorocarbon at the measurement temperature range of −50 to 38° C.

Comparative Manufacturing Example 2

2-Ethylhexyl ester of coconut fatty acid ($C_8$ to $C_{20}$ aliphatic straight-chain monocarboxylic acid mixture) was prepared in the same manner as in Example 1. The resulting ester had a total acid number of 0.01 mgKOH/g, a water content of 15 ppm, a kinematic viscosity of 5.3 mm$^2$/s (40° C.) and 1.9 mm$^2$/s (100° C.), and a volume resistivity of $5.7 \times 10^{13}$ Ω·cm. However, when the ester was subjected to measurement of the two-layer separation temperature, it was found that the ester was not miscible with the fluorocarbon at the measurement temperature range of −50 to 38° C.

Oil mixtures were prepared using the esters of Manufacturing Examples 1 and 2. The details will be given in Manufacturing Examples 6 through 14.

Manufacturing Example 6

The (2-ethylhexyl) 2-ethylhexanoate obtained in Manufacturing Example 1 and trimethylol propane tri(3,5,5-trimethylhexanoate) prepared in the same manner as in Manufacturing Example 1 were mixed in a weight ratio of 17:83, giving an ester mixture. The mixture was then dehydrated for 5 hours at a temperature of 100° C. and a reduced pressure of 13.3 MPa. The resulting ester had a total acid number of 0.01 mgKOH/g, a water content of 24 ppm, a kinematic viscosity of 15.1 mm$^2$/s (40° C.) and 3.1 mm$^2$/s (100° C.), a volume resistivity of $8.3 \times 10^{13}$ Ω·cm, and a two-layer separation temperature of −32° C.

Manufacturing Example 7

The (2-ethylhexyl) 2-ethylhexanoate obtained in Manufacturing Example 1, and an ester of pentaerythritol and a branched acid mixture (2-ethylhexanoic acid/3,5,5-trimethylhexanoic acid=50/50) prepared in the same manner as in Manufacturing Example 1 were mixed in a weight ratio of 33:67, giving an ester mixture. The mixture was then dehydrated for 5 hours at a temperature of 100° C. and a reduced pressure of 13.3 MPa. The resulting ester had a total acid number of 0.01 mgKOH/g, a water content of 32 ppm, a kinematic viscosity of 15.3 mm$^2$/s (40° C.) and 3.3 mm$^2$/s (100° C.), a volume resistivity of $3.3 \times 10^{14}$ Ω·cm, and a two-layer separation temperature of −19° C.

Manufacturing Example 8

The (2-ethylhexyl) 2-ethylhexanoate obtained in Manufacturing Example 1 and diisodecyl phthalate (tradename "Sansocizer DIDP", manufactured by New Japan Chemical Co., Ltd.) were mixed in a weight ratio of 40:60, giving an ester mixture. The mixture was then dehydrated for 5 hours at a temperature of 100° C. and a reduced pressure of 13.3 MPa. The resulting ester had a total acid number of 0.01 mgKOH/g, a water content of 11 ppm, and a kinematic viscosity of 10.2 mm$^2$/s (40° C.) and 2.3 mm$^2$/s (100° C.).

Manufacturing Example 9

The (2-ethylhexyl) 2-ethylhexanoate obtained in Manufacturing Example 1 and di(2-ethylhexyl) 4-cyclohexene-1, 2-dicarboxylate prepared in the same manner as in Manufacturing Example 1 were mixed in a weight ratio of 15:85, giving an ester mixture. The mixture was then dehydrated for 5 hours at a temperature of 100° C. and a reduced pressure of 13.3 MPa. The resulting ester had a total acid number of 0.01 mgKOH/g, a water content of 19 ppm, a kinematic viscosity of 11.8 mm$^2$/s (40° C.) and 2.7 mm$^2$/s (100° C.), a volume resistivity of 4.7×10$^{13}$ Ω·cm, and a two-layer separation temperature of 6° C.

Manufacturing Example 10

The (2-ethylhexyl) 2-ethylhexanoate obtained in Manufacturing Example 1 and diisononyl 4-cyclohexene-1,2-dicarboxylate prepared in the same manner as in Manufacturing Example 1 were mixed in a weight ratio of 30:70, giving an ester mixture. The mixture was then dehydrated for 5 hours at a temperature of 100° C. and a reduced pressure of 13.3 MPa. The resulting ester had a total acid number of 0.01 mgKOH/g, a water content of 15 ppm, and a kinematic viscosity of 9.6 mm$^2$/s (40° C.) and 2.5 mm$^2$/s (100° C.).

Manufacturing Example 11

The (2-ethylhexyl) 2-ethylhexanoate obtained in Manufacturing Example 1 and di(3,5,5-trimethylhexyl) 4-cyclohexene-1,2-dicarboxylate prepared in the same manner as in Manufacturing Example 1 were mixed in a weight ratio of 40:60, giving an ester mixture. The mixture was then dehydrated for 5 hours at a temperature of 100° C. and a reduced pressure of 13.3 MPa. The resulting ester had a total acid number of 0.01 mgKOH/g, a water content of 28 ppm, a kinematic viscosity of 9.1 mm$^2$/s (40° C.) and 2.2 mm$^2$/s (100° C.), a volume resistivity of 5.6×10$^{13}$ Ω·cm, and a two-layer separation temperature of −12° C.

Manufacturing Example 12

The (3,5,5-trimethylhexyl) 2-ethylbutanoate obtained in Manufacturing Example 2 and diisodecyl 1,2-cyclohexanedicarboxylate prepared in the same manner as in Manufacturing Example 1 were mixed in a weight ratio of 30:70, giving an ester mixture. The mixture was then dehydrated for 5 hours at a temperature of 100° C. and a reduced pressure of 13.3 MPa. The resulting ester had a total acid number of 0.01 mgKOH/g, a water content of 23 ppm, and a kinematic viscosity of 11.5 mm$^2$/s (40° C.) and 2.7 mm$^2$/s (100° C.).

Manufacturing Example 13

The (3,5,5-trimethylhexyl) 2-ethylbutanoate obtained in Manufacturing Example 2 and diisobutyl phthalate and di(2-ethylhexyl) phthalate prepared in the same manner as in Manufacturing Example 1 were mixed in a weight ratio of 30:35:35, giving an ester mixture. The mixture was then dehydrated for 5 hours at a temperature of 100° C. and a reduced pressure of 13.3 MPa. The resulting ester had a total acid number of 0.01 mgKOH/g, a water content of 15 ppm, a kinematic viscosity of 10.2 mm$^2$/s (40° C.) and 2.3 mm$^2$/s (100° C.), a volume resistivity of 4.5×10$^{12}$ Ω·cm, and a two-layer separation temperature of −35° C.

Manufacturing Example 14

The (2-ethylhexyl) 2-ethylhexanoate obtained in Manufacturing Example 1 and diisobutyl 1,2-cyclohexanedicarboxylate and diisononyl 1,2-cyclohexanedicarboxylate prepared in the same manner as in Manufacturing Example 1 were mixed in a weight ratio of 15:50:35, giving an ester mixture. The mixture was then dehydrated for 5 hours at a temperature of 100° C. and a reduced pressure of 13.3 MPa. The resulting ester had a total acid number of 0.01 mgKOH/g, a water content of 24 ppm, a kinematic viscosity of 8.9 mm$^2$/s (40° C.) and 2.3 mm$^2$/s (100° C.), a volume resistivity of 6.2×10$^{12}$ Ω·cm, and a two-layer separation temperature of −25° C.

Comparative Manufacturing Example 3

Neopentyl glycol di(3,5,5-trimethylhexnoate) was prepared in the same manner as in Manufacturing Example 1. The resulting ester had a total acid number of 0.01 mgKOH/g, a water content of 18 ppm, and a kinematic viscosity of 12.9 mm$^2$/s (40° C.) and 3.1 mm$^2$/s (100° C.).

Comparative Manufacturing Example 4

Neopentyl glycol di(2-ethylhexnoate) and neopentyl glycol di(3,5,5-trimethylhexnoate) were mixed in a weight ratio of 40:60, giving an ester mixture. The mixture was then dehydrated for 5 hours at a temperature of 100° C. and a reduced pressure of 13.3 MPa. The resulting ester had a total acid number of 0.01 mgKOH/g, a water content of 17 ppm, and a kinematic viscosity of 10.2 mm$^2$/s (40° C.) and 2.6 mm$^2$/s (100° C.).

Comparative Manufacturing Example 5

Neopentyl glycol di(2-ethylhexnoate) and trimethylol propane tri(2-ethylhexanoate) were mixed in a weight ratio of 35:65, giving an ester mixture. The mixture was then dehydrated for 5 hours at a temperature of 100° C. and a reduced pressure of 13.3 MPa. The resulting ester had a total acid number of 0.01 mgKOH/g, a water content of 28 ppm, a kinematic viscosity of 15.6 mm$^2$/s (40° C.) and 3.2 mm$^2$/s (100° C.), a volume resistivity of 9.5×10$^{13}$ Ω·cm, and a two-layer separation temperature of −50° C. or below.

Examples 1 Through 14

The hydrolytic stability of the esters obtained in Manufacturing Examples 1 through 14 was evaluated. The results are given in Table 1.

Comparative Examples 1 Through 5

The hydrolytic stability of the esters obtained in Comparative Manufacturing Examples 1 through 5 was evaluated. The results are given in Table 2.

TABLE 1

Hydrolytic stability of Esters of Manufacturing Examples

| Example | Ester | After 20 hours | | | | | After 40 hours | | | | |
|---|---|---|---|---|---|---|---|---|---|---|---|
| | | Total acid number [mgKOH/g] | Steel | Copper | Alumi-num | Color of oil | Total acid number [mgKOH/g] | Steel | Copper | Alumi-num | Color of oil |
| 1 | Ester of Manufacturing Example 1 | 0.08 | ○ | Δ | ○ | White | 0.23 | ○ | Δ | ○ | white |
| 2 | Ester of Manufacturing Example 2 | 0.10 | ○ | Δ | ○ | White | 0.51 | Δ | Δ | ○ | white |
| 3 | Ester of Manufacturing Example 3 | 0.14 | ○ | Δ | ○ | White | 0.58 | ○ | Δ | ○ | white |
| 4 | Ester of Manufacturing Example 4 | 0.12 | ○ | Δ | ○ | White | 0.47 | ○ | Δ | ○ | white |
| 5 | Ester of Manufacturing Example 5 | 0.14 | ○ | Δ | ○ | White | 0.38 | ○ | Δ | ○ | white |
| 6 | Ester of Manufacturing Example 6 | 0.22 | ○ | Δ | ○ | White | 1.26 | Δ | Δ | ○ | white |
| 7 | Ester of Manufacturing Example 7 | 0.28 | ○ | Δ | ○ | White | 0.98 | Δ | Δ | ○ | white |
| 8 | Ester of Manufacturing Example 8 | 0.55 | ○ | Δ | ○ | White | 1.42 | Δ | Δ | ○ | white |
| 9 | Ester of Manufacturing Example 9 | 0.20 | ○ | Δ | ○ | White | 0.59 | ○ | Δ | ○ | white |
| 10 | Ester of Manufacturing Example 10 | 0.13 | ○ | Δ | ○ | White | 0.60 | ○ | Δ | ○ | white |
| 11 | Ester of Manufacturing Example 11 | 0.13 | ○ | Δ | ○ | White | 0.55 | ○ | Δ | ○ | white |
| 12 | Ester of Manufacturing Example 12 | 0.11 | ○ | Δ | ○ | White | 0.62 | ○ | Δ | ○ | white |
| 13 | Ester of Manufacturing Example 13 | 0.49 | ○ | Δ | ○ | White | 1.36 | Δ | Δ | ○ | white |
| 14 | Ester of Manufacturing Example 14 | 0.12 | ○ | Δ | ○ | White | 0.44 | ○ | Δ | ○ | white |

TABLE 2

Hydrolytic stability of Esters of Comparative Manufacturing Examples

| Comparative Example | Ester | After 20 hours | | | | | After 40 hours | | | | |
|---|---|---|---|---|---|---|---|---|---|---|---|
| | | Total acid number [mgKOH/g] | Steel | Copper | Alumi-num | Color of oil | Total acid number [mgKOH/g] | Steel | Copper | Alumi-num | Color of oil |
| 1 | Ester of Comparative Manufacturing Example 1 | 7.25 | x | Δ | ○ | Pale yellow | 14.32 | x | Δ | ○ | Pale yellow |
| 2 | Ester of Comparative Manufacturing Example 2 | 5.72 | x | Δ | ○ | Pale yellow | 11.54 | x | x | ○ | Pale yellow |
| 3 | Ester of Comparative Manufacturing Example 3 | 6.32 | x | Δ | ○ | Pale yellow | 18.22 | x | x | ○ | Pale yellow |
| 4 | Ester of Comparative Manufacturing Example 4 | 3.26 | x | Δ | ○ | Pale yellow | 9.42 | x | x | ○ | Pale yellow |
| 5 | Ester of Comparative Manufacturing Example 5 | 0.53 | ○ | Δ | ○ | white | 1.45 | Δ | x | ○ | white |

Examples 1 through 5 show that the present esters have good hydrolytic stability, have a small increase in total acid number, and cause substantially no change on metal surfaces. Their refrigerant miscibility and electrical insulating properties are also excellent. They also have an extremely low kinematic viscosity at 40° C., are capable of reducing energy loss during the operation of refrigerators, and are effective for saving energy.

On the other hand, Comparative Examples 1 and 2 show that aliphatic straight-chain monocarboxylic acid esters have poor hydrolytic stability and refrigerant miscibility.

In Examples 6 through 14, the ester was mixed with various other esters. The oil mixtures with a kinematic viscosity at 40° C. adjusted to between 10 and 15 mm$^2$/s also have good hydrolytic stability, and therefore the present esters can be used as viscosity regulators to reduce the viscosity.

Comparative Examples 3 through 5, on the other hand, show that branched-chain carboxylic acid esters of neopentyl glycol suffered a large increase in total acid number, with a tendency to cause a greater level of metal corrosion.

What is claimed is:

1. A lubricating oil for refrigerators, characterized in that it comprises a mixture of:

a) at least one aliphatic saturated branched-chain carboxylic acid monoalkyl ester represented by the formula (1)

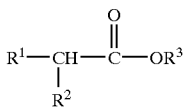

(1)

wherein $R^1$ is $C_1$ to $C_{18}$ straight-chain alkyl or $C_3$ to $C_{18}$ branched-chain alkyl; $R^2$ is hydrogen, $C_1$ to $C_{18}$ straight-chain alkyl or $C_3$ to $C_{18}$ branched-chain alkyl; with the proviso that the total number of carbon atoms contained in the alkyls represented by $R^1$ and $R^2$ is 2 to 18 and that when $R^2$ is hydrogen, $R^1$ is branched-chain alkyl; and $R^3$ is $C_3$ to $C_{12}$ straight-chain alkyl, $C_3$ to $C_{11}$ branched-chain alkyl or $C_3$ to $C_{10}$ cycloalkyl; and b) at least one member selected from the group consisting of:
i) fatty acid polyol esters,
ii) phthalic acid esters,
iii) alicyclic dicarboxylic acid esters,
iv) polyvinyl ethers,
v) hydrocarbon oils, and
vi) polyalkylene glycols, the weight ratio of component a):component b) being 0.5:99.5 to 99.5:0.5.

2. The lubricating oil according to claim 1, wherein the total number of carbons of the alkyls represented by $R^1$ and $R^2$ is 2 to 13.

3. The lubricating oil according to claim 2, wherein $R^3$ is $C_3$ to $C_{12}$ straight- or $C_3$ to $C_{11}$ branched-chain alkyl.

4. The lubricating oil according to claim 1, wherein $R^1$ and $R^2$ are $C_1$ to $C_{17}$ straight-chain alkyl or $C_3$ to $C_{18}$ branched-chain alkyl.

5. A lubricating oil according to claim 1, wherein one of $R^1$ and $R^2$ is $C_1$ to $C_5$ straight-chain alkyl or $C_3$ to $C_5$ branched-chain alkyl, and the other of $R^1$ and $R^2$ is $C_1$ to $C_{17}$ straight-chain alkyl or $C_3$ to $C_{17}$ branched-chain alkyl.

6. The lubricating oil according to claim 1, wherein the aliphatic saturated branched-chain carboxylic acid monoalkyl ester represented by the formula (1) is obtained by subjecting an aliphatic saturated branched-chain carboxylic acid represented by the formula (2):

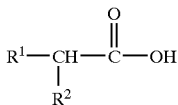

(2)

wherein $R^1$ and $R^2$ are as defined in claim 1 and an aliphatic monohydric alcohol represented by the formula (3)

$R^3$—OH     (3)

wherein $R^3$ is as defined in claim 1 to an esterification reaction.

7. The lubricating oil according to claim 6, wherein the aliphatic saturated branched-chain carboxylic acid represented by the formula (2) is at least one member selected from the group consisting of isobutanoic acid, 2-methylbutanoic acid, 2-ethylbutanoic acid, 2,3-dimethylbutanoic acid, 2-methylpentanoic acid, 2-methylhexanoic acid, 2-ethylpentanoic acid, 2,4-dimethylpentanoic acid, 2-ethylhexanoic acid, 2-methylheptanoic acid, 2-propyl-pentanoic acid, 2-ethyloctanoic acid, 2-methylnonanoic acid and 2-pentylnonanoic acid.

8. The lubricating oil according to claim 6, wherein the aliphatic monohydric alcohol represented by the formula (3) is at least one member selected from the group consisting of isopropanol, isobutanol, sec-butanol, cyclohexanol, n-heptanol, isoheptanol, 2-ethylhexanol, 1-methylheptanol, isooctanol, isononanol, 3,5,5-trimethyl-hexanol, 2,6-dimethyl-4-heptanol, isodecanol and isoundecanol.

9. The lubricating oil according to claim 1, wherein the aliphatic saturated branched-chain carboxylic acid monoalkyl ester represented by the formula (1) is at least one member selected from the group consisting of isopropyl 2-ethylhexanoate, isobutyl 2-ethylhexanoate, (sec-butyl) 2-ethylhexanoate, isopentyl 2-ethylhexanoate, cyclohexyl 2-ethylhexanoate, isoheptyl 2-ethylhexanoate, (2-ethylhexyl) 2-ethylhexanoate, (1-methylheptyl) 2-ethylhexanoate, isooctyl 2-ethylhexanoate, isononyl 2-ethylpentanoate, (3,5,5-trimethylhexyl) 2-ethylhexanoate, (2,6-dimethyl-4-heptyl) 2-ethylhexanoate, isodecyl 2-ethylhexanoate, isoundecyl 2-ethylhexanoate, (n-propyl) 2-ethylhexanoate, (n-butyl) 2-ethylhexanoate, (n-pentyl) 2-ethylhexanoate, (n-hexyl) 2-ethylhexanoate, (n-heptyl) 2-ethylhexanoate, (n-octyl) 2-ethylhexanoate, (n-nonyl) 2-ethylhexanoate, (n-decyl) 2-ethylhexanoate, (n-undecyl) 2-ethylhexanoate and (n-dodecyl) 2-ethylhexanoate.

10. The lubricating oil according to claim 1, wherein the aliphatic saturated branched-chain carboxylic acid monoalkyl esters represented by the formula (1) is a) (2-ethylhexyl) 2-ethylhexanoate,
b) isononyl 2-ethylhexanoate,
c) (3,5,5-trimethylhexyl) 2-ethylhexanoate,
d) (3,5,5-trimethylhexyl) 2-ethylbutanoate, or
e) a mixture of (2-ethylhexyl) 2-ethylhexanoate and (n-dodecyl) 2-ethylhexanoate.

11. The lubricating oil according to claim 1, wherein the aliphatic saturated branched-chain carboxylic acid monoalkyl ester represented by the formula (1) has a kinematic viscosity of 0.5 to 15 mm$^2$/s at 40° C.

12. The lubricating oil according to claim 1, which has a kinematic viscosity of 4 to 36 mm$^2$/s at 40° C.

13. The lubricating oil according to claim 1, wherein component b) is at least one member selected from the group consisting of i) fatty acid polyol esters, iii) alicyclic dicarboxylic acid esters and iv) polyvinyl ethers.

14. The lubricating oil according to claim 1, wherein the fatty acid polyol ester is a full ester of a $C_5$ to $C_{10}$ aliphatic polyhydric alcohol with 2 to 6 hydroxyl groups and a $C_3$ to $C_{22}$ straight- or branched-chain saturated or unsaturated fatty acid, and the alicyclic dicarboxylic acid ester is represented by the formula (4)

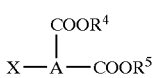

(4)

wherein A is a cyclohexane ring or a cyclohexene ring; X is hydrogen or methyl; and $R^4$ and $R^5$ are the same or different and each independently represents a $C_3$ to $C_{22}$ straight- or branched-chain saturated or unsaturated aliphatic monovalent hydrocarbon group.

15. A working fluid composition for refrigerators, comprising (I) the aliphatic saturated branched-chain carboxylic acid monoalkyl ester represented by the formula (1) according to claim 1, and (II) a refrigerant.

16. A working fluid composition for refrigerators, comprising:

(I) a) at least one aliphatic saturated branched-chain carboxylic acid monoalkyl ester represented by the formula (1), and b) at least one member selected from the group consisting of i) fatty acid polyol esters, ii) phthalic acid esters, iii) alicyclic dicarboxylic acid esters, iv) polyvinyl ethers, v) hydrocarbon oils and vi) polyalkylene glycols, and (II) a refrigerant.

17. A method for lubricating a refrigerator, comprising the step of placing the lubricating oil according to any one of claims 1 or 12 to 14 inside a refrigerator compressor.

18. A method for lubricating a refrigerator, comprising the step of pacing a mixture of a) at least one aliphatic saturated branched-chain carboxylic acid monoalkyl ester represented by the formula (1) according to claim 1; and b) at least one member selected from the group consisting of i) fatty acid polyol esters, ii) phthalic acid esters, iii) alicyclic dicarboxylic acid esters, iv) polyvinyl ethers, v) hydrocarbon oils and vi) polyalkylene glycols, inside a refrigerator compressor.

* * * * *